(12) United States Patent
Ito et al.

(10) Patent No.: US 7,379,131 B2
(45) Date of Patent: May 27, 2008

(54) LIQUID CRYSTAL DISPLAY DEVICE

(75) Inventors: Tadashi Ito, Minami-ashigara (JP); Junichi Hirakata, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 10/550,947

(22) PCT Filed: Mar. 26, 2004

(86) PCT No.: PCT/JP2004/004324

§ 371 (c)(1),
(2), (4) Date: Sep. 21, 2006

(87) PCT Pub. No.: WO2004/088405

PCT Pub. Date: Oct. 14, 2004

(65) Prior Publication Data

US 2007/0035682 A1    Feb. 15, 2007

(30) Foreign Application Priority Data

| Mar. 28, 2003 | (JP) | ............................ 2003-090438 |
| Mar. 28, 2003 | (JP) | ............................ 2003-090439 |
| Jul. 28, 2003 | (JP) | ............................ 2003-202225 |
| Jul. 28, 2003 | (JP) | ............................ 2003-202226 |
| Mar. 22, 2004 | (JP) | ............................ 2004-082200 |
| Mar. 22, 2004 | (JP) | ............................ 2004-082201 |

(51) Int. Cl.
*G02F 1/1335* (2006.01)

(52) U.S. Cl. .......................... 349/96; 349/102; 349/99

(58) Field of Classification Search ................ 349/98, 349/96, 101, 102, 103, 99; 428/1.31
See application file for complete search history.

(56) References Cited

U.S. PATENT DOCUMENTS 5,895,106 A    4/1999    VanderPloeg et al.  ...... 349/120

(Continued)

FOREIGN PATENT DOCUMENTS

EP    0 793 133 A2    9/1997

(Continued)

OTHER PUBLICATIONS

Ohmura et al., "33.3: Development of Super-High-Image-Quality Vertical-Alignment-Mode LCD," *1997 SID International Symposium Digest of Technical Papers*, May 13, 1997, pp. 845-848, vol. 28, SID International Symposium Digest of Technical Papers, Santa Ana, CA XP000722823 ISSN: 0097-966X.

(Continued)

*Primary Examiner*—Brian M. Healy
(74) *Attorney, Agent, or Firm*—Buchanan Ingersoll & Rooney PC

(57) ABSTRACT

A novel liquid crystal display device is disclosed. The device comprises two polarizer films, a liquid crystal cell disposed between these two polarizer films wherein liquid-crystalline molecules are oriented substantially normal to the substrates under non-operative state in the absence of applied external electric field; at least one layer of a first optically-anisotropic layer having an optically positive refractive anisotropy having Re falling within a range from 40 to 150 nm at visible light; and at least one layer of a second optically-anisotropic layer having an optically negative refractive anisotropy, and having Re of 10 nm or less and Rth falling within a range from 60 to 250 nm at visible light.

27 Claims, 2 Drawing Sheets

U.S. PATENT DOCUMENTS

| | | | | |
|---|---|---|---|---|
| 6,136,225 | A | 10/2000 | Meyer et al. | 252/299.01 |
| 6,839,103 | B2 * | 1/2005 | Kelly et al. | 349/98 |
| 2001/0026338 | A1 | 10/2001 | Aminaka | 349/117 |
| 2002/0149725 | A1 | 10/2002 | Hashimoto | 349/117 |
| 2003/0038912 | A1 * | 2/2003 | Broer et al. | 349/122 |
| 2003/0164920 | A1 * | 9/2003 | Kelly et al. | 349/194 |
| 2006/0221275 | A1 * | 10/2006 | Matsufuji | 349/96 |

FOREIGN PATENT DOCUMENTS

| | | |
|---|---|---|
| EP | 0 793 133 A3 | 9/1997 |
| EP | 0193133 A | 9/1997 |
| EP | 0793133 A | 9/1997 |
| EP | 0 926 533 A2 | 6/1999 |
| EP | 0 926 533 A3 | 6/1999 |
| WO | WO-96/10774 A1 | 4/1996 |
| WO | WO-02/059192 A1 | 8/2002 |

OTHER PUBLICATIONS

Chen et al., "Optimum Film Compensation Modes for TN and VA LCDs," *Soc. Inf. Display*, 1998, pp. 315-318, Santa Anaheim, CA XP002284819.

* cited by examiner

LIQUID CRYSTAL DISPLAY DEVICE

FIELD OF THE INVENTION

The present invention relates to liquid crystal display devices, and in particular to a vertically-oriented nematic liquid crystal display devices excellent in viewing angle characteristics.

RELATED ART

A liquid crystal display device usually comprises a liquid crystal cell and a polarizer plate. The polarizer plate usually has a protective film and a polarizer film, and is typically obtained by staining a polarizer film made of a polyvinyl alcohol film with iodine, stretching the film, and stacking protective films on both surfaces of the film. In some configuration of transmission-type liquid crystal display devices, the polarizer plate may be attached on both sides of the liquid crystal cell, and some cases also adopt one or more optical compensation sheet placed thereon. In reflection-type liquid crystal display devices, a reflective plate, a liquid crystal cell, one or more optical compensation sheet(s) and the polarizer plate are disposed in this order. The liquid crystal cell comprises liquid-crystalline molecules, two substrates for encapsulating the liquid-crystalline molecules in between, and electrode layer for applying voltage to the liquid-crystalline molecules. The liquid crystal cell performs ON/OFF display based on difference in the orientation state of the liquid-crystalline molecules, and is applicable both to transmission type and reflection type. Proposed examples of the display modes include TN (twisted nematic), IPS (in-plane switching), OCB (optically compensatory bend), VA (vertically aligned) and ECB (electrically controlled birefringence).

For applications in need of high-quality display, 90°-twisted nematic liquid crystal display devices (generally referred to as "TN mode"), among of various types of LCDs, are mainly adopted, based on use of nematic liquid crystal molecules having a positive dielectric anisotropy constant and are driven by thin-film transistors. A TN mode display may have an excellent display characteristic in a frontal viewing, but suffers from viewing angle characteristics such as reduction in the contrast in a perspective viewing, or degradation of the display characteristic due to gradation inversion characterized by inversion in brightness in a gradation display. These are matters of strong demands for improvement.

As one LCD system capable of improving the viewing angle characteristics, a recent proposal has been made on vertically-aligned nematic liquid crystal display device (referred to as "VA mode", hereinafter) based on use of a nematic liquid crystal molecules having a negative dielectric anisotropy, having the longitudinal axis thereof oriented nearly normal to the substrate in the absence of applied voltage, and is driven by thin-film transistors (see Japanese Laid-Open Patent Publication No. Hei 2-176625). The VA mode is excellent not only in the display characteristics in a frontal viewing similarly to the TN mode, but also in exhibiting a wide viewing angle characteristic when applied with a retardation film for compensating viewing angle. In the VA mode, use of two sheets of negative uniaxial retardation film, each of which having an optical axis in the direction normal to the film plane, on the front and back sides of the liquid crystal cell is successful in obtaining a wide viewing angle characteristic, where it is already known that further wider viewing angle characteristic can be realized by adopting an uniaxial retardation film having an in-plane retardation value of 50 nm and a positive refractive anisotropy to the LCD (see SID 97 DIGEST, p. 845 to 848).

Use of three sheets of retardation films is, however, not only causative of increase in the production cost, but also causative of lowering in the yield ratio due to bonding works of a number of films, and increase in the thickness due to use of a plurality of films, which is disadvantageous in view of thinning of the display device. Another disadvantage resides in use of a tacking layer for stacking the stretched films, which may result in separation of the films or warping due to shrinkage of the tacking layer affected by changes in temperature or humidity.

Methods for solving these problems have been disclosed, which include a method of reducing the number of sheets of the retardation films (Japanese Laid-Open Patent Publication No. 11-95208), and a method of using a cholesteric liquid crystal layer (Japanese Laid-Open Patent Publication Nos. 2003-15134 and 11-95208). Even in these methods, a need for bonding of a plurality of films still remains, and this results in only limited effects in reducing the thickness and production costs. Another problem is that leakage light in the oblique direction from the polarizer plate is observed in the black display mode, which indicates only an insufficient expansion effect of the viewing angle (the viewing angle is not fully expanded to a theoretically expectable level).

DISCLOSURE OF THE INVENTION

It is therefore an object of the present invention to provide a liquid crystal display device, in particular of VA mode, having a liquid crystal cell optically compensated in an exact manner, needing only a small number of sheets to be bonded, and allowing thinning of the device.

In one aspect, the present invention provides a liquid crystal display device comprising:

two polarizer films having absorption axes being crossed normal to each other;

a liquid crystal cell disposed between these two polarizer films, comprising a pair of substrate and a liquid crystal layer composed of liquid-crystalline molecules held therebetween, wherein liquid-crystalline molecules are oriented substantially normal to the substrates under non-operative state in the absence of applied external electric field;

at least one layer of a first optically-anisotropic layer having an optically positive refractive anisotropy, being formed of rod-like liquid-crystalline molecules and having Re, defined below, falling within a range from 40 to 150 nm at visible light; and at least one layer of a second optically-anisotropic layer having an optically negative refractive anisotropy, and having Re, defined below, of 10 nm or less and Rth, defined below, falling within a range from 60 to 250 nm at visible light:

$$Re=(nx-ny)\times d \tag{1}$$

$$Rth=\{(nx+ny)/2-nz\}\times d \tag{2}$$

(where, nx denotes refractive index in the slow-axis direction in a layer plane; ny denotes in-plane refractive index in the direction normal to nx; nz denotes refractive index in the thickness-wise direction of a layer; and d denotes thickness of a layer).

As embodiments of the present invention, there are provided the liquid crystal display device wherein the first optically-anisotropic layer is a layer formed of rod-like liquid-crystalline molecules having a polymerizable group;

the liquid crystal display device wherein the first optically-anisotropic layer is a layer formed of rod-like liquid-crystalline molecules each represented by a formula (I) below:

$$Q^1\text{-}L^1\text{-}A^1\text{-}L^3\text{-}M\text{-}L^4\text{-}A^2\text{-}L^2\text{-}Q^2 \quad \text{Formula (I)}$$

where, each of $Q^1$ and $Q^2$ independently denotes a polymerizable group; each of $L^1$, $L^2$, $L^3$ and $L^4$ independently denotes a single bond or divalent linking group; each of $A^1$ and $A^2$ independently denotes a $C_{2\text{-}20}$ spacer group; and M denotes a mesogen group; the liquid crystal display device wherein the first optically-anisotropic layer is a layer formed of rod-like liquid-crystalline molecules homogenously oriented in the direction substantially normal to the absorption axis of the polarizer film disposed closer to the first optically-anisotropic layer; the liquid crystal display device wherein the second optically-anisotropic layer is a layer formed of discotic liquid-crystalline molecules or polymer; the liquid crystal display device wherein the second optically-anisotropic layer is a layer formed of discotic liquid-crystalline molecules having a polymerizable group; the liquid crystal display device wherein the second optically-anisotropic layer is a layer formed of a discotic liquid-crystalline molecules oriented substantially in a homeotropic manner; the liquid crystal display device wherein the second optically anisotropic layer is formed of cellulose acylate having acetyl and $C_{3\text{-}22}$ acyl replacing hydroxy and a degree of acetylation "A" and a degree of $C_{3\text{-}22}$ acylation "B" satisfy the formula (C) below:

$$2.0 \leq A+B \leq 3.0; \quad \text{Formula (C)}$$

the liquid crystal display device wherein the $C_{3\text{-}22}$ acyl is butanoyl or propionyl; the liquid crystal display wherein the second optically-anisotropic layer also functions as a protective film for at least one of the two polarizer films; the liquid crystal display device wherein the first optically-anisotropic layer and the second optically-anisotropic layer are disposed while placing the liquid crystal cell between the first and the second layers; the liquid crystal display device wherein the absorption axis of the polarizer film disposed closer to the first optically-anisotropic layer crosses substantially normal to the longitudinal direction of a transparent protective film of the polarizer film; and the liquid crystal display device wherein at least one of the two polarizer films has a protective film formed of cellulose acetate which is disposed closer to the liquid crystal cell and has Re of less than 3 nm.

In another aspect, the present invention provides a liquid crystal display device comprising:

two polarizer films having the absorption axes being crossed normal to each other;

a liquid crystal cell disposed between these two polarizer films, comprising a pair of substrate and a liquid crystal layer composed of liquid-crystalline molecules held therebetween, wherein liquid-crystalline molecules are oriented substantially normal to the substrates under non-operative state in the absence of applied external electric field;

at least one layer of a first optically-anisotropic layer formed of a stretched thermoplastic polymer film having an optically positive refractive anisotropy, and having Re, defined below, falling within a range from 40 to 150 nm at visible light; and at least one layer of a second optically-anisotropic layer having an optically negative refractive anisotropy, formed of discotic liquid-crystalline molecules, and having Re, defined below, of 10 nm or less and Rth falling within a range from 60 to 250 nm at visible light:

$$Re = (nx-ny) \times d \quad (1)$$

$$Rth = \{(nx+ny)/2 - nz\} \times d \quad (2)$$

(where, nx denotes refractive index in the slow-axis direction in a layer plane; ny denotes in-plane refractive index in the direction normal to nx; nz denotes refractive index in the thickness-wise direction of the layer; and d denotes thickness of a layer).

As embodiments of the present invention, there are provided the liquid crystal display device wherein the first optically-anisotropic layer is a stretched polycarbonate copolymer film; the liquid crystal display device wherein the second optically-anisotropic layer is formed of discotic liquid-crystalline molecules having a polymerizable group; the liquid crystal display device wherein the discotic liquid-crystalline molecules of the second optically-anisotropic layer are oriented substantially in a homeotropic manner; the liquid crystal display device wherein the first optically-anisotropic layer also functions as a protective film for at least one of the two polarizer films; the liquid crystal display device wherein the absorption axis of the polarizer film closer to the first optically-anisotropic layer crosses substantially normal to the longitudinal direction of a transparent protective film of the polarizer film; and the liquid crystal display device wherein at least one of the two polarizer films has a protective film formed of cellulose acetate which is disposed closer to the liquid crystal cell and has Re of less than 3 nm.

In another aspect, the present invention provides a liquid crystal display device comprising:

two polarizer films having the absorption axes being crossed normal to each other;

a liquid crystal cell disposed between these two polarizer films, comprising a pair of substrate and a liquid crystal layer composed of liquid-crystalline molecules held therebetween, wherein liquid-crystalline molecules are oriented substantially normal to the substrates under non-operative state in the absence of applied external electric field;

at least one layer of a first optically-anisotropic layer formed of cellulose acylate having an optically positive refractive anisotropy, and having Re, defined below, falling within a range from 40 to 150 nm at visible light, wherein the cellulose acylate has acetyl and $C_{3\text{-}22}$ acyl replacing hydroxy and a degree of acetylation "A" and a degree of $C_{3\text{-}22}$ acylation "B" satisfy the formula (C) below; and at least one layer of a second optically-anisotropic layer having an optically negative refractive anisotropy, formed of discotic liquid-crystalline molecules, and having Re, defined below, of 10 nm or less and Rth falling within a range from 60 to 250 nm at visible light:

$$Re = (nx-ny) \times d \quad (1)$$

$$Rth = \{(nx+ny)/2 - nz\} \times d \quad (2)$$

(where, nx denotes refractive index in the slow-axis direction in a layer plane; ny denotes in-plane refractive index in the direction normal to nx; nz denotes refractive index in the thickness-wise direction of the layer; and d denotes thickness of a layer);

$$2.0 \leq A+B \leq 3.0. \quad \text{Formula (C)}$$

As an embodiment of the present invention, the liquid crystal display device wherein the $C_{3\text{-}22}$ acyl is butanoyl or propionyl.

It is to be noted in this patent specification that a term "substantially" in conjunction with angle means a range of ±5° or less around a precise angle. Difference from the precise angle is preferably smaller than 4°, and more preferably smaller than 3°. "Slow axis" herein means a direction in which the maximum refractive index is obtained. The refractive index herein is a value measured at λ=550 nm in the visible light region unless otherwise specifically noted. "Visible light" in the context of this patent specification means light in a range from 400 nm to 700 nm. Terms "polarizer film" and "polarizer plate" are discriminatingly used in this patent specification, where the "polarizer plate" means a stack having a transparent protective film for protecting the polarizer film at least on one surface of the "polarizer film".

BEST MODE FOR CARRYING OUT THE INVENTION

Figure 1:
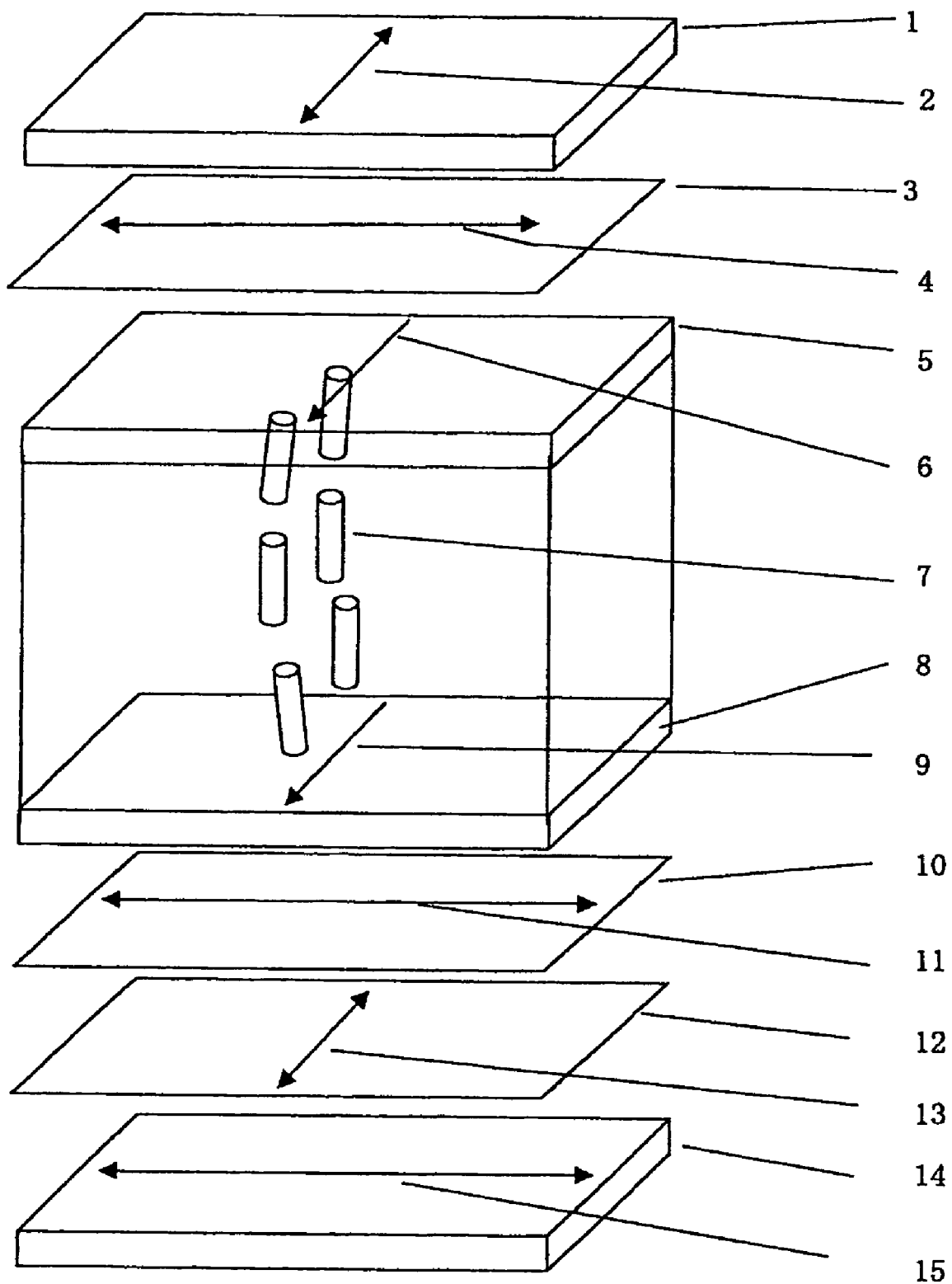
FIG. 1 is a schematic perspective view showing an exemplary liquid crystal display device of the present invention.

The present invention will specifically be described. First, one embodiment of the liquid crystal display device of the present invention will be explained referring to the drawings.

Figure 2:
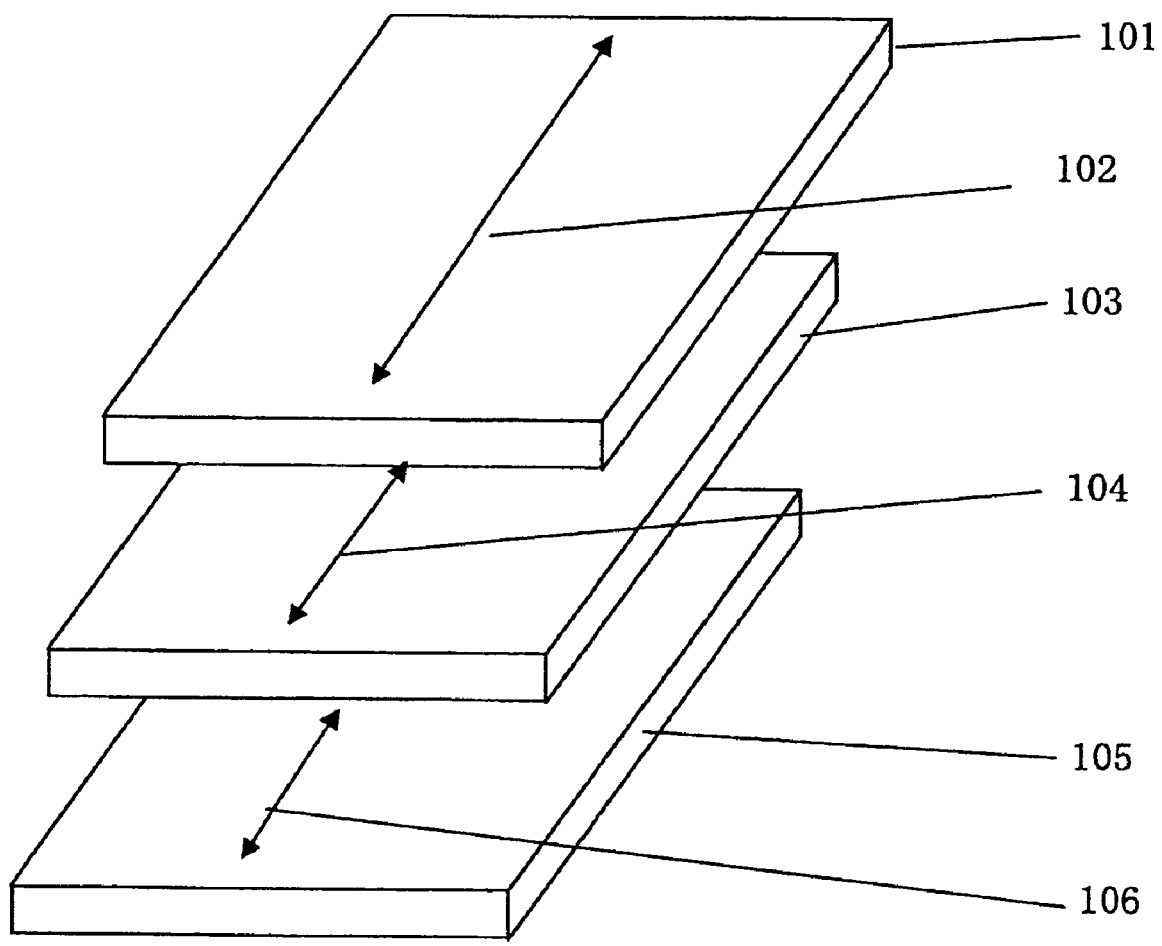
FIG. 2 is a schematic perspective view showing an exemplary polarizer film applicable to the present invention.

FIG. 1 is a schematic drawing showing an exemplary liquid crystal display device of the present invention, and FIG. 2 is a schematic drawing showing an exemplary configuration of a polarizer plate applicable to the present invention. FIG. 1 deals with a case based on active driving of a nematic liquid crystal having a negative dielectric anisotropy is used as a field-effect-type liquid crystal.

[Liquid Crystal Display Device]

The liquid crystal display device shown in FIG. 1 comprises a liquid crystal cell comprising elements 5 to 8, and a pair of polarizer plates 1 and 14 disposed on both surfaces of the liquid crystal cell. A first optically-anisotropic layer 3 is disposed between the polarizer plate 1 and the liquid crystal cell comprising elements 5 to 8; and second optically-anisotropic layers 10 and 12 are disposed between the polarizer plate 14 and the liquid crystal cell comprising elements 5 to 8. The liquid crystal cell comprises an upper electrode substrate 5, a lower electrode substrate 8, and liquid-crystalline molecules 7 held between them. The liquid-crystalline molecules 7 are controlled, as being aligned with the direction of rubbing treatment carried out on the opposing surfaces of the electrode substrates 5 and 8, so as to be oriented nearly normal to the substrates under non-operative state in the absence of applied external electric field. The upper polarizer plate 1 and the lower polarizer plate 14 are stacked so that the absorption axis 2 and the absorption axis 15 thereof cross almost normal with each other.

As shown in FIG. 2, each of the polarizer plates 1 and 14 comprises protective films 101, 105, and a polarizer film 103 held therebetween. The polarizer plates 1 and 14 are typically obtained by staining the polarizer film made of a polyvinyl alcohol film with iodine, stretching the film so as to obtain the polarizer film 103, and stacking protective films 101, 105 on both surfaces thereof. In the stacking process, roll-to-roll laminating a pair of protective films and the polarizer film, three films in total, is preferable in view of productivity. The roll-to-roll laminating is also preferable because, as shown in FIG. 2, the protective films 101, 105 and polarizer film 103 can readily be stacked so that the slow axes 102, 106 of the former two and the absorption axis 104 of the latter are aligned in parallel, and this is preferable in view of making the polarizer film less causative of dimensional change and curling, and excellent in mechanical stability. The same effect will be obtained if at least two axes of three films are aligned substantially in parallel, cases of which being exemplified by the slow axis of either of the protective films and the absorption axis of the polarizer film, or by the slow axes of two protective films.

Referring now back to FIG. 1, the first optically-anisotropic layer 3 has an optically positive refractive anisotropy, and has retardation (Re) of 40 to 150 nm at visible light. On the other hand, the second optically-anisotropic layers 10, 12 have optically negative refractive anisotropy, and has Re of 10 nm or less and Rth of 60 to 250 nm at visible light. The first and second optically-anisotropic layers 3, 10 may be a layer composed of a liquid-crystalline compound or a polymer film, where materials composing the layers will be described later. The optically-anisotropic layers 3, 10 and 12 contribute to clearing image coloring of the liquid crystal cell and improving in viewing angle.

Although FIG. 1 showed an exemplary liquid crystal display device having two layers of the second optically-anisotropic layers, the second optically-anisotropic layer may also be provided as a single layer or as three or more layers. The same will apply also to the first optically-anisotropic layer.

Assuming now the upper side of FIG. 1 as an observer's side, FIG. 1 shows an exemplary configuration in which the first optically-anisotropic layer 3 is disposed between the polarizer plate 1 on the observer's side and the liquid crystal cell substrate 5 on the observer's side, and the second optically-anisotropic layers 10, 12 are disposed between the polarizer plate 14 on the back side and the liquid crystal cell substrate 8 on the back side, where the first optically-anisotropic layer and the second optically-anisotropic layer may be exchanged with each other; both of the first and second optically-anisotropic layers may be disposed between the polarizer plate 1 on the observer's side and the liquid crystal cell substrate 5 on the observer's side; or disposed between the polarizer plate 14 on the back side and the liquid crystal cell substrate 8 on the back side. In these embodiments, either of the second optically-anisotropic layer and first optically-anisotropic layer may also function as a support of the other, if possible.

The first optically-anisotropic layer 3 can be incorporated into the liquid crystal display device as being integrated with the polarizer plate 1. In an embodiment where the first optically-anisotropic layer is formed of a rod-like liquid-crystalline molecules, the first optically-anisotropic layer is generally formed on a support such as a polymer film, so that it is allowable to make the support of the first optically-anisotropic layer also function as a protective film of the polarizer film on one side, and it is preferable to configure an integrated polarizer plate as having the transparent protective film, the polarizer film, the transparent protective film (also functions as the transparent support), and the first optically-anisotropic layer stacked in this order. For the case where the integrated polarizer plate is incorporated into the liquid crystal display device, it is preferable to incorporate it so that the transparent protective film, the polarizer film, the transparent protective film (also functions as the substrate) and the first optically-anisotropic layer are disposed in this order as viewed from external of the device (from the side more distant from the liquid crystal cell). In the case where the first optically-anisotropic layer is a stretched thermoplastic polymer film, the film itself can be used as the protective film for the polarizer film, so that it is also allowable to use the first optically-anisotropic layer typically as a protective film of the polarizer film on one side, and it is preferable to configure the integrated polarizer plate as having the transparent protective film, the polarizer film, and the first optically-anisotropic layer (also functions as the transparent protective film) stacked in this order. For the case where the integrated polarizer plate is incorporated into the liquid crystal display device, it is preferable to incorporate it so that the transparent protective film, the polarizer film and the first optically-anisotropic layer (also functions as the transparent protective film) are disposed in this order as viewed from external of the device (from the side more distant from the liquid crystal cell).

The same will apply also to the second optically-anisotropic layer 12, and it can be incorporated into the liquid crystal display device as being integrated with the polarizer plate 14. In an embodiment where the second optically-anisotropic layer 12 is composed of a liquid-crystalline compound, one of the protective films of the polarizer plate 14 may also function as a transparent support of the second optically-anisotropic layer 12. In this embodiment, it is preferable to configure the integrated polarizer plate as having the transparent protective film, the polarizer film, the transparent protective film (also functions as the transparent support) and the second optically-anisotropic layer stacked in this order, and the integrated polarizer plate is incorporated into the liquid crystal display device so that the transparent protective film, the polarizer film, the transparent protective film (also functions as the substrate) and the second optically-anisotropic layer are disposed in this order as viewed from external of the device (from the side more distant from the liquid crystal cell).

In still another case where the second optically-anisotropic layer 12 is a polymer film, the second optically-anisotropic layer 12 may serve as one of the protective films of the polarizer plate 14. In this embodiment, it is preferable to configure the integrated polarizer plate as having the transparent protective film, the polarizer film and the second optically-anisotropic layer (also functions as the transparent protective film) stacked in this order, and the integrated polarizer plate is incorporated into the liquid crystal display device so that the transparent protective film, the polarizer film, and the second optically-anisotropic layer (also functions as the transparent protective film) are disposed in this order as viewed from external of the device (from the side more distant from the liquid crystal cell).

The liquid crystal display device of the present invention is not limited to the above-described configurations and may include other members. For example, a color filter may be disposed between the liquid crystal cell and the polarizer plate. Another possible embodiment of a transmission-type liquid crystal display device may have, disposed on the back side thereof, a back light using a cold or hot cathode fluorescent tube, light emitting diode or electroluminescent element as a light source. On the other hand, in the embodiment of the reflection-type liquid crystal display device, only one polarizer plate disposed on the observation side will suffice, where a reflective film is disposed on the back surface of the liquid crystal cell or on the inner surface of the lower substrate of the liquid crystal cell. Of course, it is also allowable to dispose a front light which comprises the above-described light on the observation side. It is still also allowable to configure a semi-transparent-type device in which each pixel of the display device has a transmission section and reflective section.

Types of the liquid crystal display device of the present invention are not specifically limited, and any liquid crystal display devices of the direct image viewing type, image projection type and optical modulation type are included. Active-matrix liquid crystal display devices using three- or two-terminal device using TFT or MIM are effective in the present invention. Of course, it is also effective to use passive-matrix-type liquid crystal display, represented by STN-type device based on time-divisional operation.

[VA Mode Liquid Crystal Cell]

In the present invention, the liquid crystal cell is preferably a VA mode liquid crystal cell. VA-mode liquid crystal cells are generally created from an upper and a lower substrates, on whose opposing surfaces are preliminarily processed by rubbing, separated from each other at a distance and liquid crystal. For example, when liquid crystal, having $\Delta n=0.0813$ and $\Delta \epsilon=-4.6$ or around, is used, a liquid crystal cell having a director, so-called tilt angle which indicates the direction of orientation of liquid crystal molecules, of approximately 89° can be produced. The thickness d of the liquid crystal cell in this case can be adjusted to approximately 3.5 µm. Brightness in the white display mode will vary depending on product $\Delta n$ d of the thickness d of the liquid crystal layer and refractive anisotropy $\Delta n$. In view of obtaining a maximum brightness, the thickness of the liquid crystal layer d preferably falls within a range from 0.2 to 0.5 µm.

Although transparent electrodes (not shown) are formed on the inner surface of the individual alignment layers (not shown) on the substrates 5 and 8, the liquid crystal molecules 7 in the liquid crystal layer are aligned substantially normal to the surface of the substrates under non-operative in the absence of applied voltage, so that polarized state of light coming out through the liquid crystal panel will hardly vary. Because the absorption axis 2 of the upper polarizer plate 1 and the absorption axis 15 of the lower polarizer plate 14 of the liquid crystal cell cross nearly normal to each other, the light cannot go through the polarizer plate, so that the liquid crystal display device shown in FIG. 1 realizes an ideal black display under the non-operative state. On the contrary under the operative state, the liquid crystal molecules are inclined in the direction parallel to the surface of the substrate, and the light goes into the liquid crystal panel comes out from the polarizer plate after being varied in its polarized state by the liquid crystal molecules. In other words, the liquid crystal display device shown in FIG. 1 is in a white display mode under non-operative state.

The example shown in the above was such as using a liquid crystal material having a negative dielectric anisotropy so that the liquid crystal molecules can respond vertically to the direction of electric field, because the electric field herein is applied between the upper and lower substrates. For the case where the electrode is disposed on one substrate, and the electric field is applied in the lateral direction, which is in parallel to the substrate surface, it is allowable to use a liquid crystal material having a positive dielectric anisotropy.

Chiral agents, which are generally used in the TN-mode liquid crystal display devices, may be sometimes used for reducing orientation failure, but not often be used because of degrading the dynamic response characteristic, in the VA-mode liquid crystal display devices.

The VA mode is characterized in its high speed response and high contrast. A problem however resides in that the contrast may surely be high when being observed in a vertical direction, but is lowered when being observed an oblique direction. The liquid-crystalline molecules are aligned normal to the surface of the substrate in the black display mode, and this provides a high contrast in a vertical direction because the liquid crystal molecules show almost no birefringent and give a small transmissivity. The liquid-crystalline molecules, however, have birefringence in an oblique direction, and angle of crossing of the absorption axes of the upper and lower polarizer plates grows beyond 90° when being observed in the oblique direction, although the angle is 90° when being observed in a vertical direction. For these two reasons, the liquid crystal cell causes leakage of light in the oblique direction, and reduction in the contrast. To solve this problem, the present invention adopts at least one layer of the first and second optically-anisotropic layer, respectively.

The liquid-crystalline molecules in the VA-mode device are inclined in the white display mode, and have different degrees of birefringence between when being observed in an oblique direction along inclination of molecules and in an opposite direction to the direction, and this results in difference in the luminance and color tone. Multi-domain configuration of the liquid crystal cell is one preferable solution of this problem. A multi-domain configuration have pixels which respectively comprise a plurality of domains differed in the orientation state. For example, a multi-domain VA-mode liquid crystal cell has pixels which respectively comprise a plurality of domains differed in the tilt angle of the liquid-crystalline molecules under application of electric field, and this makes it possible to average, by every pixel, the tilt angle of the liquid-crystalline molecules under application of electric field, and makes it possible to average the viewing angle characteristic. Division of the orientation within a single pixel can be achieved by forming a slit or projection to the electrode to thereby alter or bias the electric field density. Increase in the number of division may successfully result in omnidirectional uniformity in the viewing angle, where four-division or eight-division or more will be sufficient for achieving an almost uniform viewing angle. In particular, eight-division is preferable because the absorption angle of the polarizer plate can be set to an arbitrary angle.

The liquid crystal molecules may have a lower response in the domain boundary of the divisional orientation, and this is causative of lowering in the luminance in the normally-black display in which black display must be maintained. Addition of a chiral agent to the liquid crystal material will be successful in minimizing the domain boundary.

Next paragraphs will detail the first and second optically-anisotropic layers used in the liquid crystal display devices of the present invention.

In the present invention, the first and second optically-anisotropic layers contribute to avoiding undesired coloring of images displayed on the liquid crystal display device, and improving the viewing angle. Because the number of component of the liquid crystal display device can successfully be reduced by allowing the support of the optically-anisotropic layer to function also as the protective film of the polarizer plate, or by allowing the optically-anisotropic layer to function also as the protective film of the polarizer plate, this embodiment is also contributable to thinning of the liquid crystal display device.

In the present invention, in-plane retardation (Re) of the first optically-anisotropic layer is 40 to 150 nm, Re of the second optically-anisotropic layer is 10 nm or less, and Rth is 60 to 250 nm. Because the first and second optically-anisotropic layers can exhibit an optical compensation function as a whole in a combined manner, the retardation is preferably adjusted as an overall value ascribable to the combination. The first and second optically-anisotropic layers preferably have Re of 30 to 200 nm and Rth of 60 to 500 nm as a whole in a combined manner. Re and Rth herein are respectively defined below:

$$Re = (nx - ny) \times d \quad (1)$$

$$Rth = \{(nx+ny)/2 - nz\} \times d \quad (2)$$

where, nx denotes refractive index in the slow-axis direction in a layer plane; ny denotes in-plane refractive index in the direction normal to nx; nz denotes refractive index in the thickness-wise direction of the layer; and d denotes thickness of a layer. As far as having the above mentioned optical properties, thicknesses of the first and second optically-anisotropic layer are not limited to any range. Usually, the thickness of the first optically anisotropic layer is preferably adjusted to 20 to 200 μm, and more preferably 40 to 150 μm.

[First Optically-Anisotropic Layer]

One embodiment of the first optically-anisotropic layer is a layer formed of rod-like liquid-crystalline molecules, and having Re of 40 to 150 nm, more preferably 50 to 120 nm. The rod-like liquid-crystalline molecules preferably has a polymerizable group. The rod-like liquid-crystalline molecules having a polymerizable group is preferably fixed in a substantially-horizontal (homogeneous) orientation. "Substantially-horizontal" described herein means that the average angle (average tilt angle) between the direction of longitudinal axis of the rod-like liquid-crystalline molecules and the surface of the optically-anisotropic layer falls within a range from 0° to 10°. The rod-like liquid-crystalline molecules may be tilted in the layer. Even such a case, the average tilt angle preferably falls within a range from 0° to 20°.

Examples of the rod-like liquid-crystalline compounds preferably used herein include azomethine compounds, azoxy compounds, cyanobiphenyl compounds, cyanophenyl esters, benzoic esters, cyclohexanecarboxylic acid phenyl esters, cyanophenylcyclohexanes, cyano-substituted phenylpyrimidines, alkoxy-substituted phenylpyrimidines, phenyldioxanes, tolanes and alkenylcyclohexyl benzonitrile. Besides the above-described low-molecular-weight, liquid crystal molecules, it is also allowable use high-molecular-weight, liquid-crystalline compounds. Especially preferable examples of the rod-like, liquid-crystalline compounds having a low-molecular-weight polymerizable group are those represented by the formula (I):

$$Q^1\text{-}L^1\text{-}A^1\text{-}L^3\text{-}M\text{-}L^4\text{-}A^2\text{-}L^2\text{-}Q^2 \qquad \text{Formula (I)}$$

where, each of $Q^1$ and $Q^2$ independently denotes a polymerizable group; each of $L^1$, $L^2$, $L^3$ and $L^4$ independently denotes a single bond or divalent linking group; each of $A^1$ and $A^2$ independently denotes a $C_{2\text{-}20}$ spacer group; and M denotes a mesogen group.

The polymerizable rod-like, liquid-crystalline compound will $Q^1$ and $Q^2$ independently denotes a polymerizable group further be detailed below.

In the formula, each of $Q^1$ and $Q^2$ independently denotes a polymerizable group. Polymerization reaction of the polymerizable group is preferably addition polymerization (including ring-opening polymerization) or condensation polymerization. In other words, the polymerizable group is preferably a functional group capable of proceeding addition polymerization and condensation polymerization. Examples of the polymerizable group will be listed below:

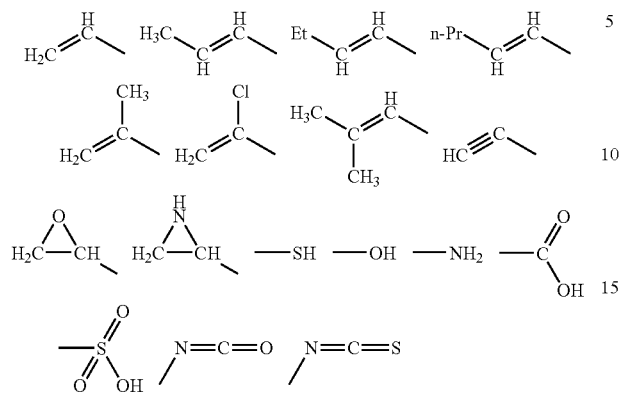

The divalent linking groups represented by $L^1$, $L^2$, $L^3$ and $L^4$ are preferably those selected from the group consisting of —O—, —S—, —CO—, —$NR_2$—, —CO—O—, —O—CO—O—, —CO—$NR^2$—, —$NR^2$—CO—, —O—CO—, —O—CO—$NR_2$—, —$NR_2$—CO—O—, —$NR^2$—CO—$NR^2$— and single bond. $R^2$ denotes a $C_{1-7}$ alkyl group or a hydrogen atom. Each of $L^3$ and $L^4$ is preferably —O— or —O—CO—O—.

Of the groups represented by a combination of $Q^1$ and $L^1$, or $Q^2$ and $L^2$, $CH_2$=CH—CO—O—, $CH_2$=C($CH_3$)—CO—O—, and $CH_2$=C(Cl)—CO—O— are preferable, and $CH_2$=CH—CO—O— is most preferable.

$A^1$ and $A^2$ are preferably a $C_{2-20}$ spacer group, and preferably a $C_{2-12}$ aliphatic group. The spacer group is more preferably has a chain form, and may contain non-neighboring oxygen atoms or sulfur atoms. Each of them may have a substituent group such as a halogen atom (fluorine, chlorine, bromine), cyano, methyl or ethyl.

The mesogen group represented by M may be selected from any known mesogen groups, and is preferably selected from the group represented by the formula (II):

where each of $W^1$ and $W^2$ denotes a divalent alicyclic group, divalent aromatic group, or a divalent heterocyclic group. Preferable examples of $W^1$ and $W^2$ include 1,4-cyclohexane-diyl, 1,4-phenylene, naphthalene-2,6-diyl and naphthalene-1,5-diyl. As for 1,4-cyclohexane diyl, either structural isomers having trans-form or cis-form, or any mixture based on an arbitrary compositional ratio may be used in the present invention, where the trans-form is preferable. $L^5$ denotes groups represented by $L^1$ to $L^4$, —$CH_2$—O— and —O—$CH_2$—. Preferable examples of $L^5$ include —$CH_2$—O—, —O—$CH_2$—, —CO—O—, —CO—$NR^2$—, —$NR^2$—CO— and —O—CO—. n expresses the number of 1, 2 or 3, and preferably 2. Each of $W^1$ and $W^2$ may have a substituent, where the examples of the substituent include halogen atoms (fluorine, chlorine, bromine, iodine), cyano, $C_{1-10}$ alkyl groups (methyl, ethyl, propyl, etc.), $C_{1-10}$ alkoxy groups (methoxy, ethoxy, etc.), $C_{1-10}$ acyl group (formyl, acetyl, etc.), $C_{1-10}$ alkoxycarbonyl group (methoxycarbonyl, ethoxycarbonyl, etc.), $C_{2-10}$ acyloxy groups (acetyloxy, propionyloxy, etc.), nitro group, trifluoromethyl group and difluoromethyl group. Basic skeleton of most preferable examples of the mesogen group represented by the formula (II) are listed below. These groups may further be substituted by the above-described substituents.

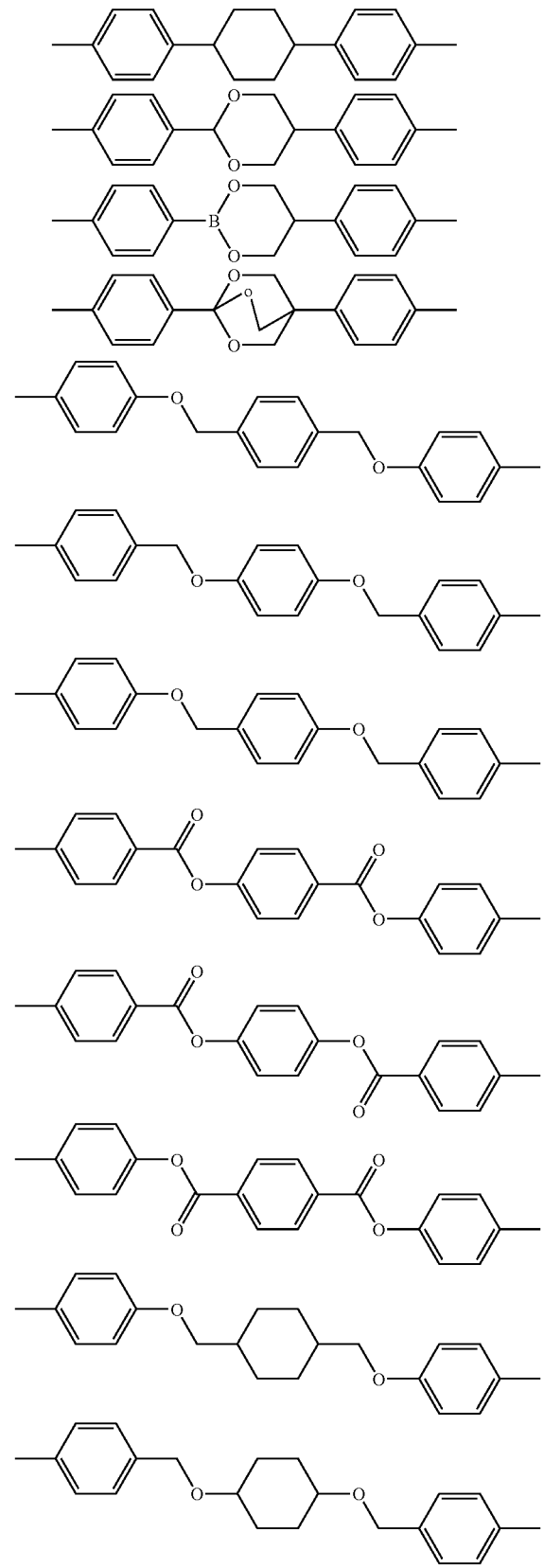

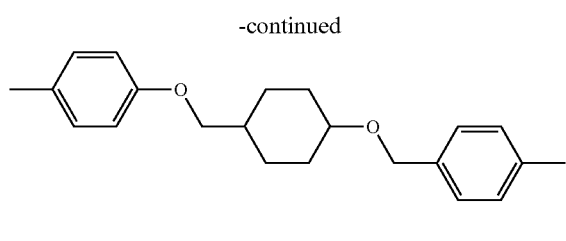
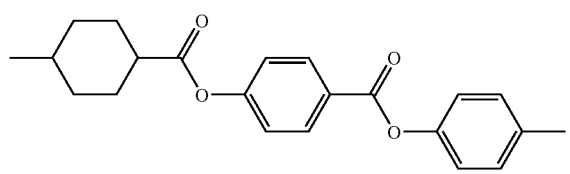
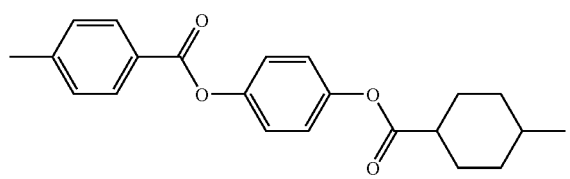
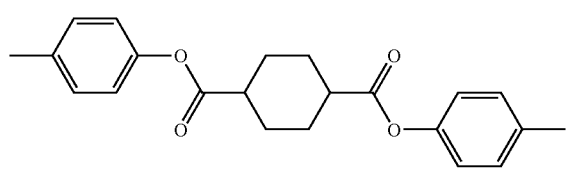

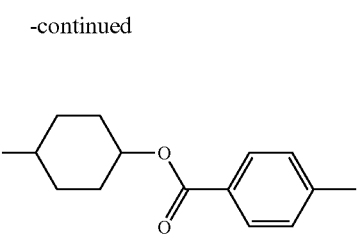

Of these, particularly preferable basic skeletons are as listed below:

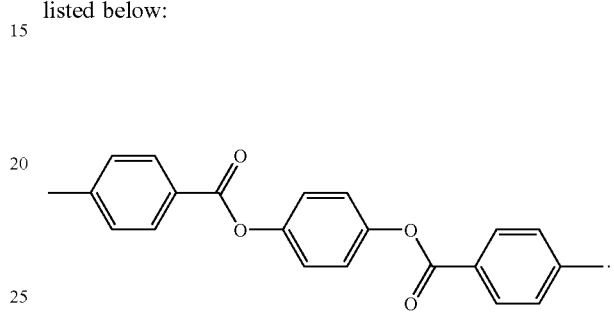

The next paragraphs will describe specific examples of the compounds represented by the formula (I) of the present invention, where the present invention is by no means limited thereto. It is to be noted that the compounds represented by the formula (I) can be synthesized referring to a method disclosed in published Japanese translation of PCT international publication, No. 11-513019.

I-1

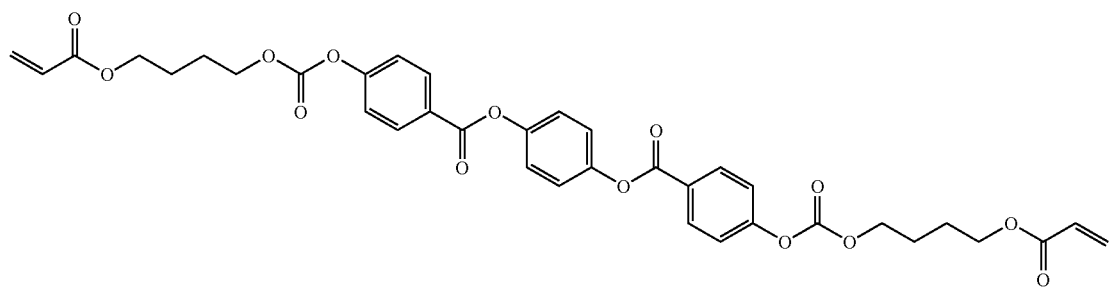

I-2

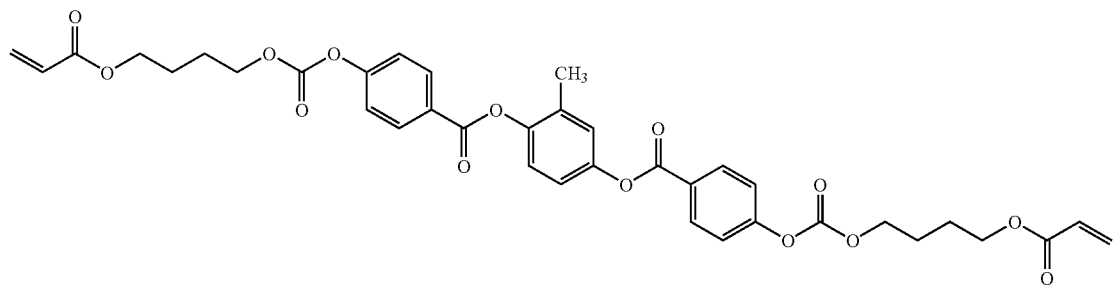

-continued
I-3
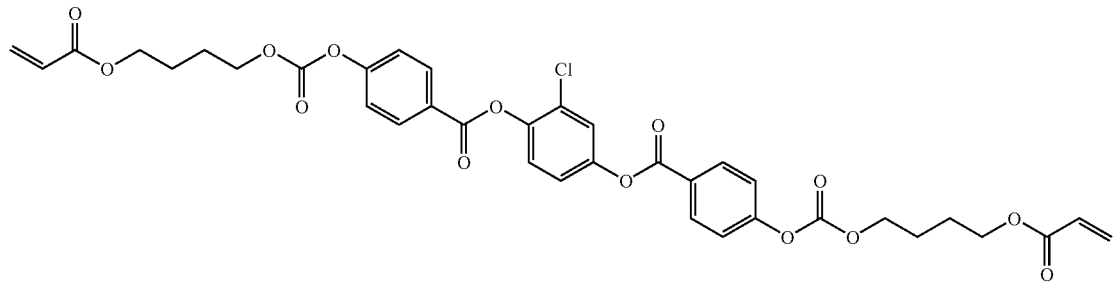
I-4
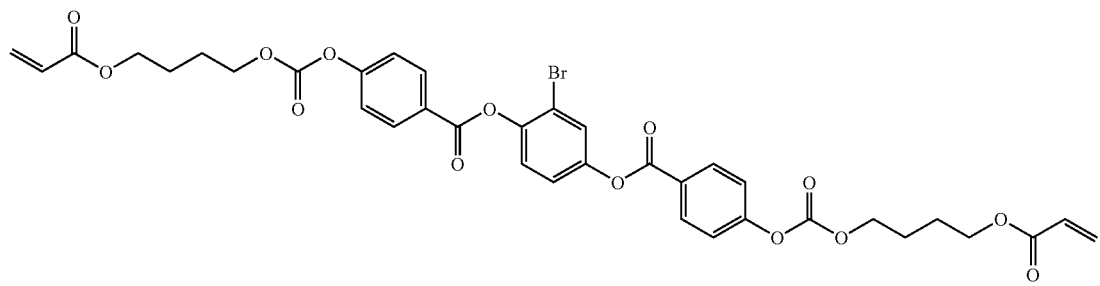
I-5
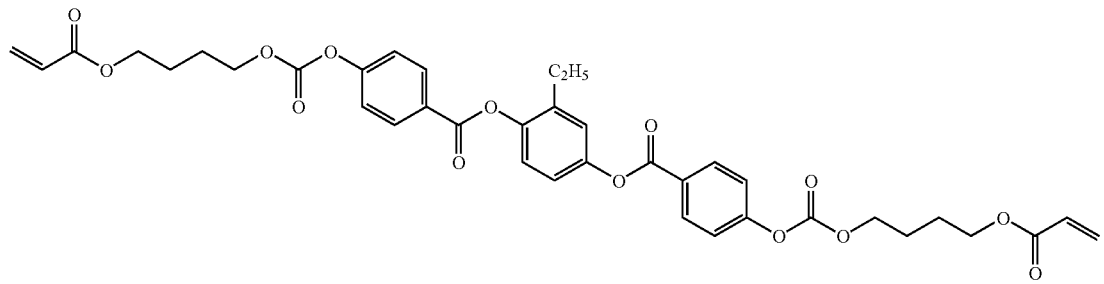
I-6
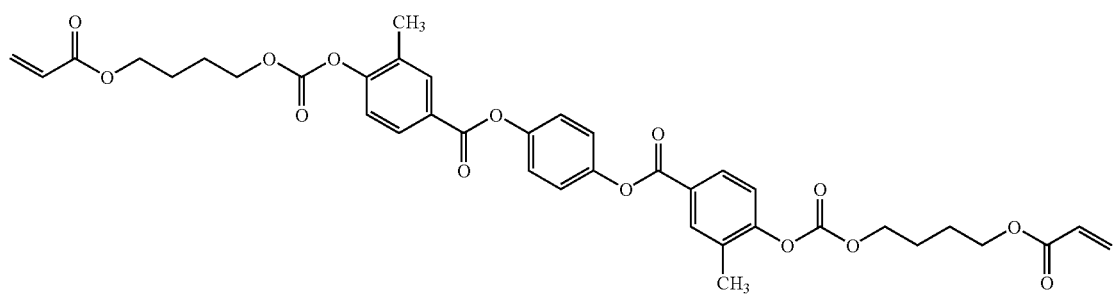
I-7
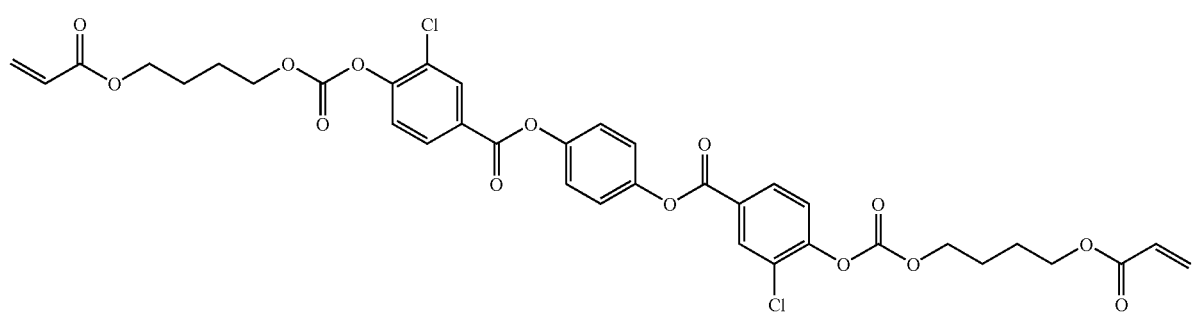

-continued
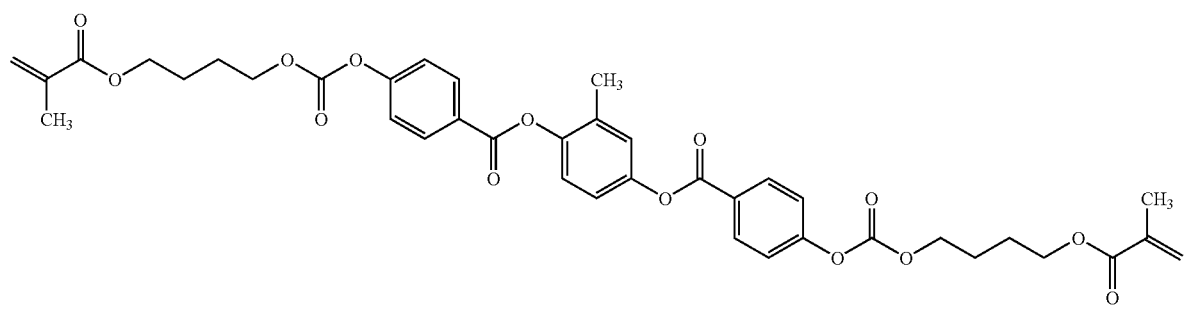
I-8
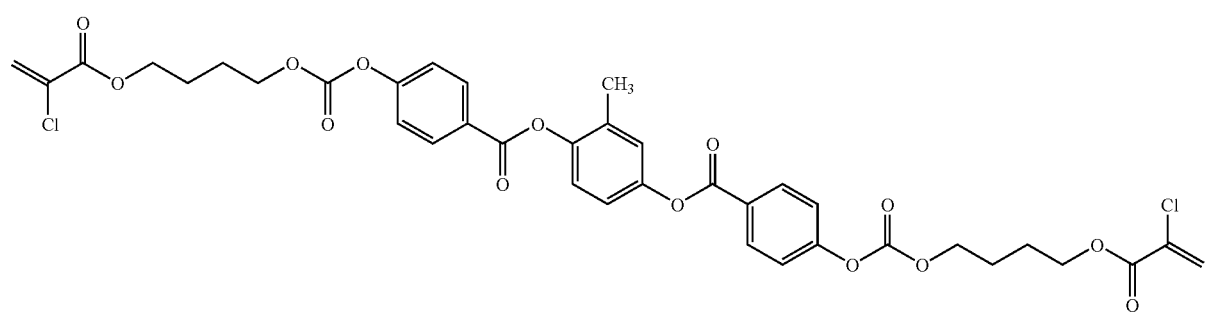
I-9
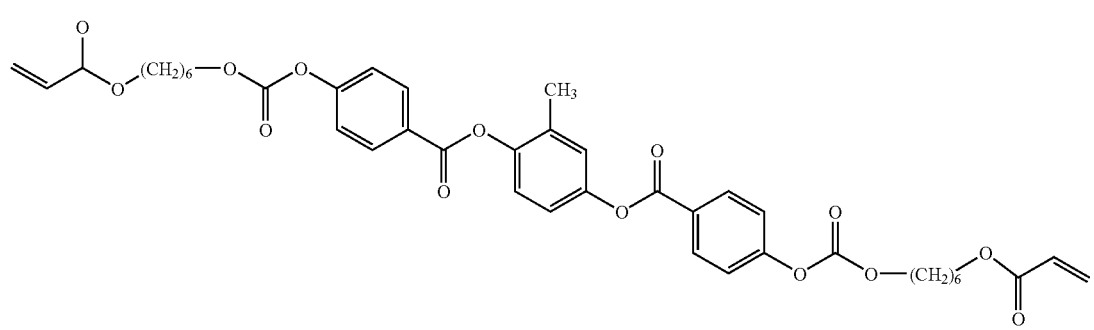
I-10
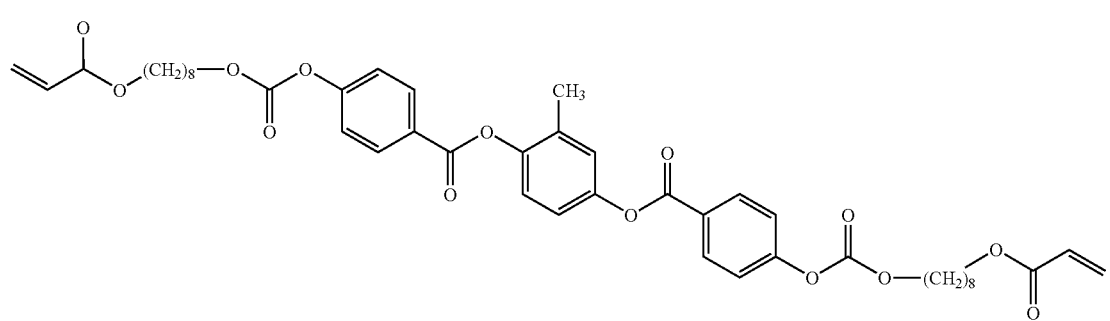
I-11
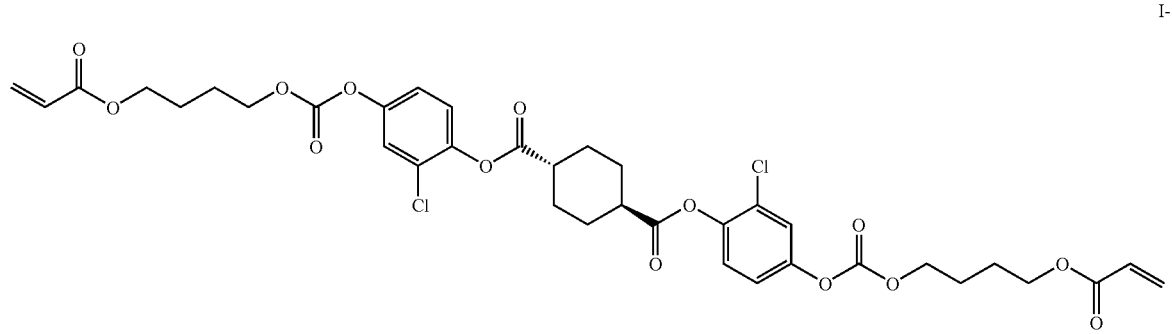
I-12

-continued
I-13
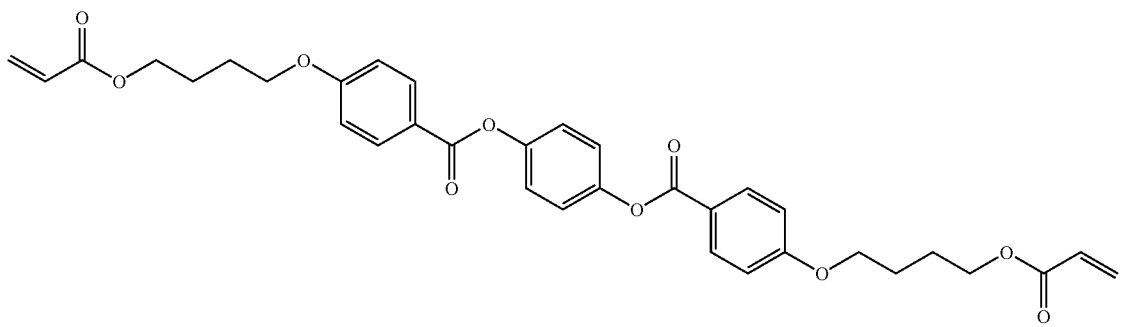
I-14
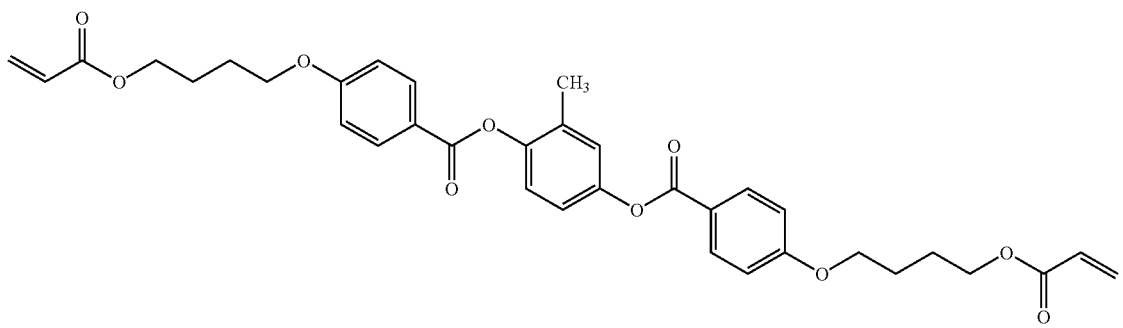
I-15
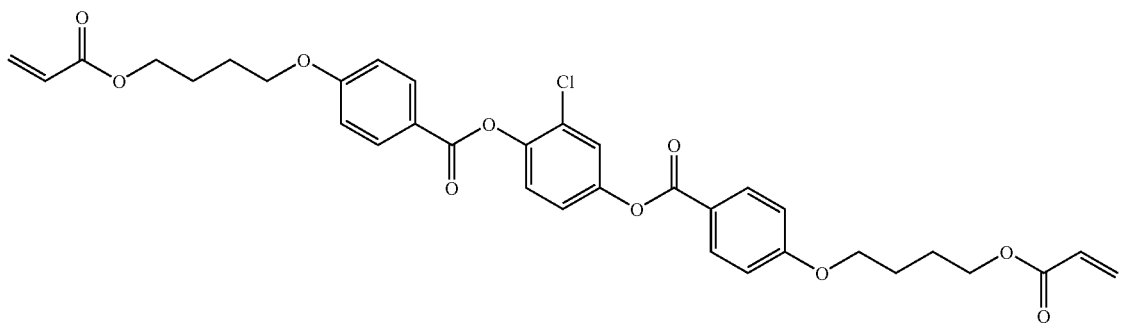
I-16
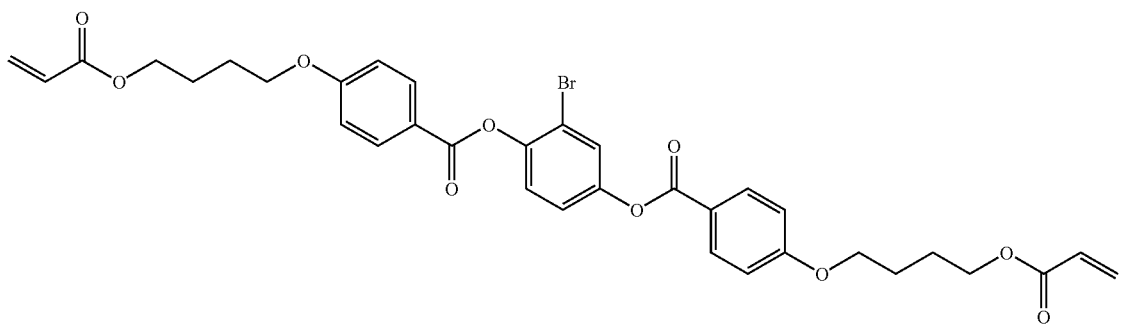

I-17
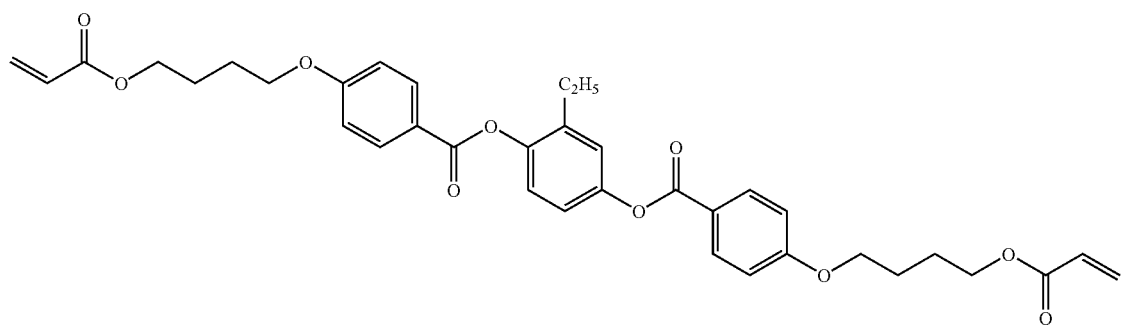
I-18
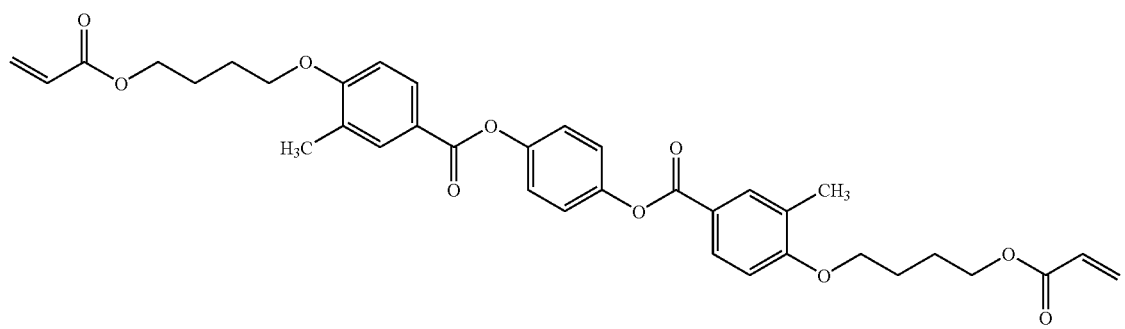
I-19
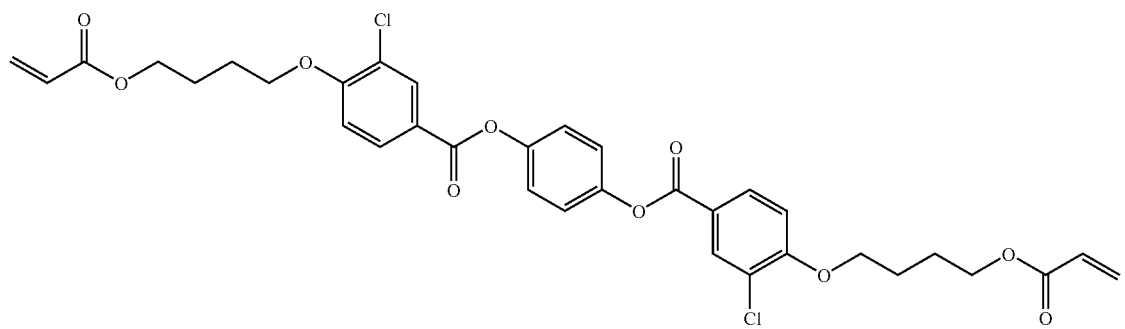
I-20
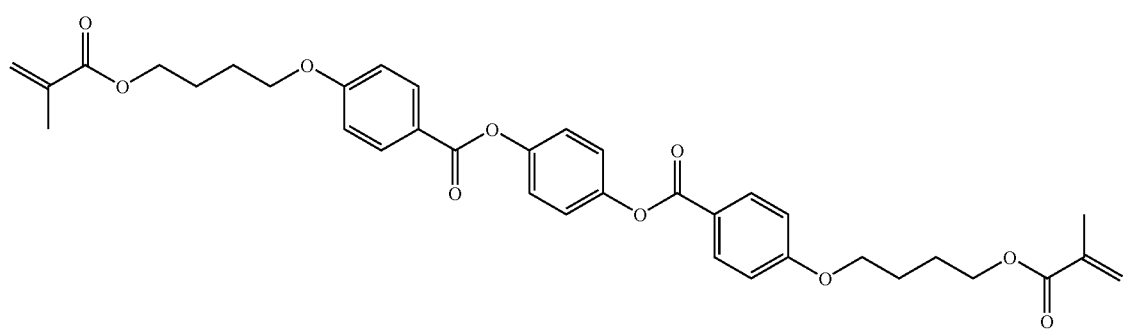

I-21
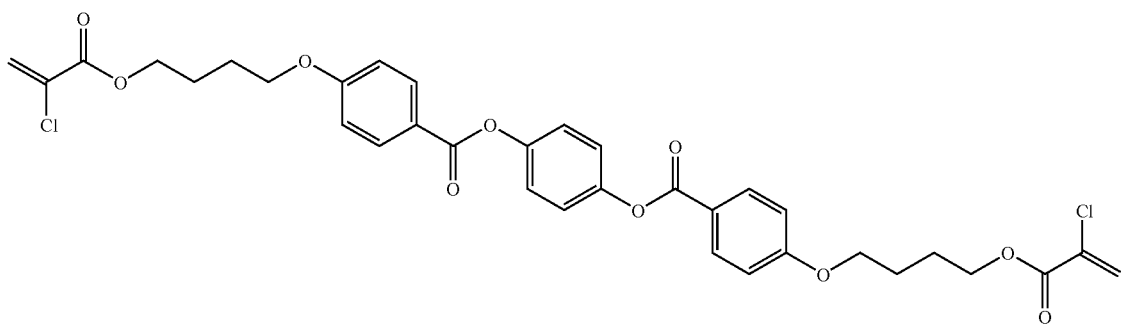
I-22
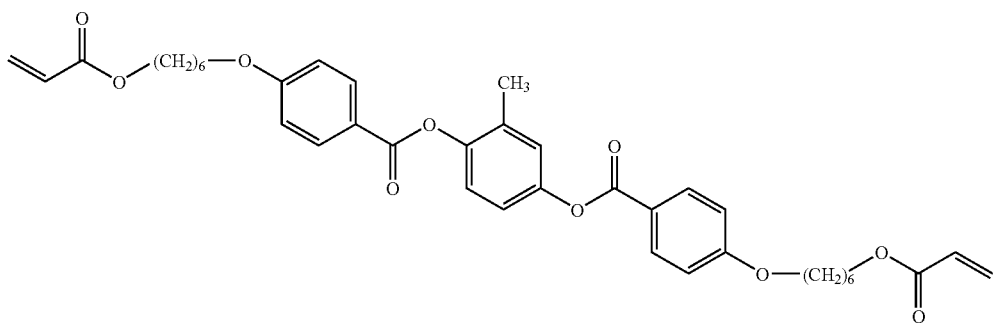
I-23
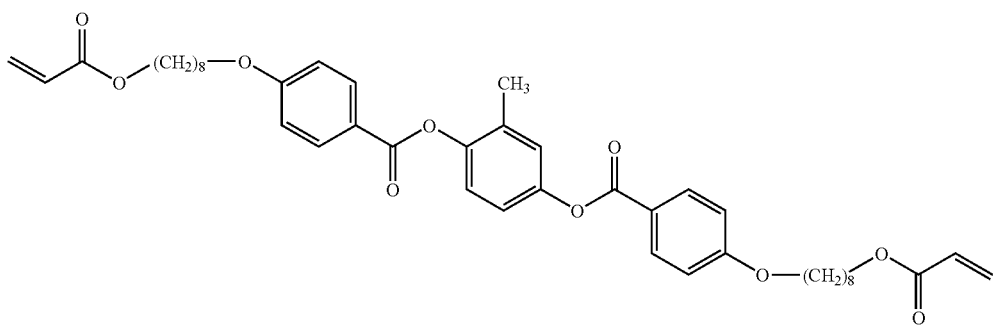
I-24
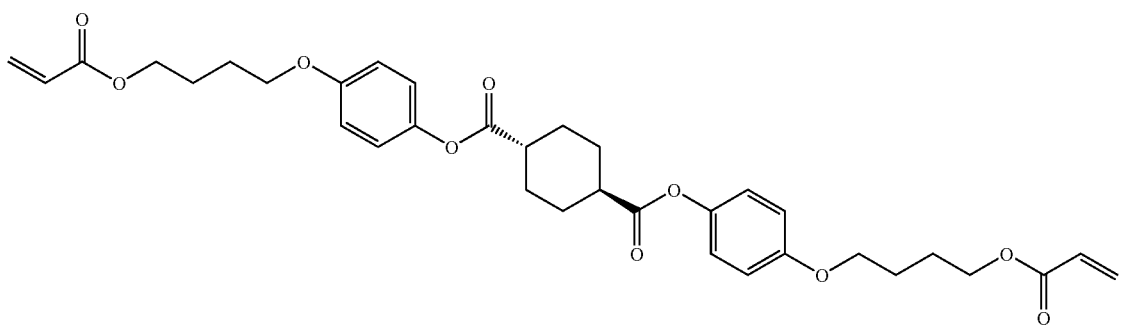

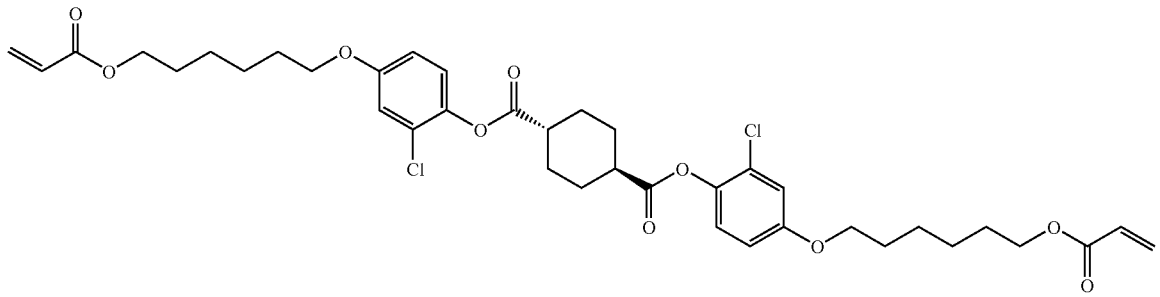

I-25

Another preferred embodiment of the first optically anisotropic layer is formed of cellulose acylate. The cellulose acylate is desirably selected from cellulose acylates satisfying the formula (C) below;

$$2.0 \leq A+B \leq 3.0. \quad \text{Formula (C)}$$

In the formula, both of "A" and "B" mean an acylation degree of cellulose acylate$_1$ and "A" means a degree of acetylation and "B" means a degree of $C_{3-22}$ acylation.

A beta-1,4-bonding-glucose-unit forming a cellulose has free hydroxy groups at 2-, 3- and 6-positions. Cellulose acylates are polymers obtained by esterification of a part of or all of such hydroxy groups with acyl groups. A degree of acylation means ratios of esterification at 2-, 3- and 6-position hydroxy groups respectively, and acylation degree 1 means 100% esterification. In the present invention, the sum of an acetylation degree "A" and a $C_{3-22}$ acylation degree "B" is desirably from 2.2 to 2.86 and more desirably from 2.40 to 2.80. The acylation degree "B" is desirably not less than 1.5 and more desirably not less tan 1.7. Desirably, not less than 28%, more desirably not less than 30%, much more desirably not less than 31% and further much more desirably not less than 32%, of the acylation degree "B" comes from the 6-position acylation degree. The sum of the 6-position acetylation degree "A" and the 6-position acylation degree "B" is desirably not less than 0.75, more desirably not less than 0.80 and much more desirably not less than 0.85. When such cellulose acylate is used, it is easier to prepare a cellulose acylate solution, especially dissolved in non-chlorine solvent, which has a low viscosity and a good filterability. A degree of acetylation "A" or a degree of acylation "B" can be measured according to a method based on D-817-91 of ASTM.

The cellulose acylate used in the present invention is desirably substituted with $C_{3-22}$ acyl, more desirably with $C_{3-15}$ acyl and much more desirably with $C_{3-9}$ acyl. The $C_{3-22}$ acyl groups may be selected from aliphatic or aryl acyl groups, and the cellulose acylate may be selected from cellulose alkyl carbonyl esters, cellulose alkenyl carbonyl esters, cellulose aryl carbonyl esters or cellulose aryl alkyl carbonyl esters, which may be further substituted. Preferred example of the $C_{3-22}$ acyl group include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphtylcarbonyl, cinnamoyl. Among these, propionyl, butanoyl dodecanoyl, octadecanoyl, t-butanoyl, oleoyl, benzoyl, naphthylcarbonyl and cinnamoyl are more preferred and propionyl and butanoyl are much more preferred.

Next, process for producing the cellulose acylates, which can be used for the optically anisotropic layer, will be described. Basic processes for producing cellulose acylates are described on pages 180 to 190 of "Wood Chemistry (MOKUZAI KAGAKU)" written by ISHIDA et al, published in 1986 by KYORITSU SHUPPAN CO., LTD. One of typical process is a liquid phase acetylation with a carboxylic acid anhydrate-acetic acid-sulfuric acid catalyst. Specifically, the process comprises a pretreatment step for treating cellulose material such as cotton linter or wood pulp with an appropriate amount of acetic acid and an esterification step for pouring the treated material into a pre-cooled mixed solution for carboxylation to esterify the material, thereby producing complete cellulose acylate having a sum of the acylation degrees at 2-, 3- and 6-positions nearly equal to 3.00. The mixed solution for carboxylation may usually contain acetic acid as a solvent, carboxylic acid anhydrate as a esterification agent and sulfuric acid as a catalyst. The carboxylic acid anhydrate may be usually used in excess amount compared with the amount of cellulose to be reacted with the anhydrate or to total amount of water contained in the reaction system. After acylation, some amount of aqueous solution of neutralizing agent such as calcium, magnesium, iron, aluminum or zinc carbonate, acetate or oxide may be added to the reaction system in order to hydrolyze residual excess carboxylic acid anhydrate and neutralize a part of esterification catalyst. Subsequently, the obtained complete cellulose acylate may be saponification-aged at 50 to 90 degrees Celsius in the presence of a small amount of acetylation reaction catalyst, usually residual sulfuric acid, to change a cellulose acylate having a desired acylation degree and a desired polymerization degree. At the time of formation of desired cellulose acylate, the reaction solution may be poured into water or dilute sulfuric acid, if necessary, after being neutralized the residual catalyst with the above-mentioned neutralizing agent completely, to separate cellulose acylate. After being dried and stabilization-treated, the desired cellulose acylate may be obtained.

The first optically anisotropic layer is desirably a polymer film substantially formed of the above-mentioned cellulose acylate. The term of "substantially formed of the above-mentioned cellulose acylate" means that not less than 55% of polymer ingredient is in the film the above-mentioned cellulose acylate, desirably not less than 70% and more desirably not less than 80% of polymer ingredient in the film is the above-mentioned cellulose acylate.

As material for preparation of the film, particles of cellulose acylate are desirably used. It is desired that not less than 90% by mass of the particles have a particle diameter falling within a range from 0.5 to 5 mm, and it is also desired that not less than 50% by mass of the particles has a particle diameter falling within a range from 1 to 4 mm. Cellulose acylate particles in a spherical shape may be desirably used.

The polymerization degree, here viscosity-average polymerization degree, of the cellulose acylate which can be used in the present invention is desirably from 200 to 700, more desirably from 250 to 550, much more desirably from 250 to 400 and further much more desirably from 250 to 300. The viscosity-average polymerization degree can be measured according to Uda's limiting viscosity method, described in Journal of The Society of Fiber Science and Technology, Japan, vol. 18, p. 105 to 120, 1962, Uda Kazuo and Saitoh Hideo. The method is also described in Japanese Laid-Open Patent Publication No. Hei 9-95538.

As removed low-molecular weight ingredient, cellulose acylate may have a low viscosity, in spite of having a high average polymerization degree, compared with usual cellulose acylate, and thus such cellulose acylate is useful. The low-molecular weight ingredients can be remove by washing cellulose acylate with any proper organic solvent. When cellulose acylate containing small amount of low-molecular ingredients is produced, the acylation reaction may be desirably carried out with 0.5 to 25 mass parts of sulfuric acid catalyst with respect to 100 mass parts of cellulose. When the sulfuric acid catalyst is used in the above mentioned amount, cellulose acylate having a good molecular-weight distribution, uniform molecular-weight distribution, can be obtained.

The cellulose acylate which can be used in the present invention desirably has a moisture content of not greater than 2% by mass, more desirably not greater than 1 & by mass, and much more desirably not greater than 0.7% by mass. Cellulose acylate usually contains 2.5 to 5% by mass of water, and in order to have the moisture content falling within the desired range, cellulose acylate is required to be dried. Any methods can be used for drying cellulose acylate.

Material cottons and producing processes of cellulose acylates which can be desirably used in the present invention are described on pages 7 to 12 in Kokai Giho No. 2001-1745 published in Mar. 5, 2001, by of Japan Institute of Invention and Innovation.

[Second Optically-Anisotropic Layer]

In the present invention, the second optically-anisotropic layer has a negative refractive anisotropy, and has Re of 10 nm or less and Rth of 60 to 250 nm at visible light. It is preferable for the second optically-anisotropic layer in the present invention to use a discotic liquid-crystalline compound or a polymer layer.

The discotic liquid-crystalline compound is preferably oriented in a substantially homeotropic manner, in which discotic face of the molecules are substantially horizontally to a layer plane and the molecules are aligned with average tilt angle of 0 to 10°. Examples of the discotic liquid-crystalline compounds are described in various literatures (C. Destrade et al., Mol. Crysr. Liq. Cryst., vol. 71, p. 111 (1981); "Ekisho no Kagaku (Science of Liquid Crystal), edited by The Chemical Society of Japan, Seasonal Chemical Review No.22, Chapter 5, and Chapter 10, Section 2 (1994); B. Kohne et al., Angew. Chem. Soc. Chem. Comm., p. 1794 (1985); and J. Zhang et al., J. Am. Chem. Soc., vol. 116, p. 2655 (1994)). Polymerization of the discotic liquid-crystalline molecules is described in Japanese Laid-Open Patent Publication No. 8-27284.

The discotic liquid-crystalline molecules preferably have a polymerizable group so that it can be fixed by polymerization. One exemplary structure of the discotic liquid-crystalline compound may possibly be such as having a discotic core and a polymerizable group bonded thereto as a substitutive group, where direct bonding between the discotic core and the polymerizable group will make it difficult to keep the orientation state in the polymerization reaction. A structure having a linking group between the discotic core and polymerizable group is therefore preferable. More specifically, the discotic liquid-crystalline compound having a polymerizable group is preferably any compounds represented by the formula (III) below:

formula (III)

where, D denotes a discotic core, L denotes a divalent linking group, P denotes a polymerizable group, and n is an integer from 4 to 12.

Preferable examples of the discotic core (D), divalent linking group (L) and polymerizable group (P) in the formula (III) are (D1) to (D15), (L1) to (L25), and (P1) to (P18), respectively, in Japanese Laid-Open Patent Publication No. 2001-4837, and the description of the publication will preferably apply to the present invention.

When the discotic liquid-crystalline molecules having a polymerizable group are used, the molecules are preferably aligned in a substantially homeotropic manner. "Substantially-homeotropic" described herein means that the average angle (average tilt angle) between the discotic surface of the discotic liquid-crystalline molecules and the surface of the optically-anisotropic layer falls within a range from 0° to 10°. Discotic liquid-crystalline may be tilt aligned, and even for the case of tilt alignment, the average tilt angle preferably falls within a range from 0° to 20°.

Polymers preferably used for the second optically-anisotropic layer may be anything so far as they have an optically negative refractive anisotropy, and preferable examples of which include polyolefins such as cellulose triacylate, Zeonex, Zeonor (both are products of Zeon Corporations) and Arton (product of JSR Corporation) in view of adjusting a value of Re to 10 nm. Other available examples include non-birefringent optical resin materials such as those described in Japanese Laid-Open Patent Publication No. 11-293116.

Another preferable embodiment of the second optically anisotropic layer is formed of cellulose acylate. The cellulose acylate is desirably selected from cellulose acylates satisfying the formula (C) below;

$$2.0 \leq A+B \leq 3.0.$$  Formula (C)

In the formula, both of "A" and "B" mean a degree of acylation in cellulose acylate, and "A" means a degree of acetylation and "B" means a degree of $C_{3-22}$ acylation.

A beta-1,4-bonding-glucose-unit forming a cellulose has free hydroxy groups at 2-, 3- and 6-positions. Cellulose acylates are polymers obtained by esterification of a part of or all of such hydroxy groups with acyl groups. A degree of acetylation means ratios of esterification at 2-, 3- and 6-position hydroxy groups respectively, and acetylation degree 1 means 100% esterification. In the present invention, the sum of an acetylation degree "A" and a $C_{3-22}$ acylation degree "B" is desirably from 2.2 to 2.86 and more desirably from 2.40 to 2.80. The acylation degree "B" is desirably not less than 1.5 and more desirably not less tan 1.7. Desirably, not less than 28%, more desirably not less than 30%, much more desirably not less than 31% and further much more desirably not less than 32%, of the acylation degree "B" comes from the 6-position acylation degree. The sum of the 6-position acetylation degree "A"

and the 6-positon acylation degree "B" is desirably not less than 0.75, more desirably not less than 0.80 and much more desirably not less than 0.85. When such cellulose acylate is used, it is easier to prepare a cellulose acylate solution, especially dissolved in non-chlorine solvent, which has a low viscosity and a good filterability. A degree of acetylation "A" or a degree of acylation "B" can be measured according to a method based on D-817-91 of ASTM.

The cellulose acylate used in the present invention is desirably substituted with $C_{3-22}$ acyl, more desirably with $C_{3-15}$ acyl and much more desirably with $C_{3-9}$ acyl. The $C_{3-22}$ acyl groups may be selected from aliphatic or aryl acyl groups, and the cellulose acylate may be selected from cellulose alkyl carbonyl esters, cellulose alkenyl carbonyl esters, cellulose aryl carbonyl esters or cellulose aryl alkyl carbonyl esters, which may be further substituted. Preferred example of the $C_{3-22}$ acyl group include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphtylcarbonyl, cinnamoyl. Among these, propionyl, butanoyl naphthylcarbonyl, cinnamoyl are more preferred and propionyl and butanoyl are much more preferred.

Next, process for producing the cellulose acylates, which can be used for the optically anisotropic layer, will be described. Basic processes for producing cellulose acylates are described on pages 180 to 190 of "Wood Chemistry (MOKUZAI KAGAKU)" written by ISHIDA et al, published in 1986 by KYORITSU SHUPPAN CO., LTD. One of typical process is a liquid phase acetylation with a carboxylic acid anhydrate-acetic acid-sulfuric acid catalyst. Specifically, the process comprises a pretreatment step for treating cellulose material such as cotton linter or wood pulp with an appropriate amount of acetic acid and an esterification step for pouring the treated material into a pre-cooled mixed solution for carboxylation to esterify the material, thereby producing complete cellulose acylate having a sum of the acylation degrees at 2-, 3- and 6-positions nearly equal to 3.00. The mixed solution for carboxylation may usually contain acetic acid as a solvent, carboxylic acid anhydrate as a esterification agent and sulfuric acid as a catalyst. The carboxylic acid anhydrate may be usually used in excess amount compared with the amount of cellulose to be reacted with the anhydrate or to total amount of water contained in the reaction system. After acylation, some amount of aqueous solution of neutralizing agent such as calcium, magnesium, iron, aluminum or zinc carbonate, acetate or oxide may be added to the reaction system in order to hydrolyze residual excess carboxylic acid anhydrate and neutralize a part of esterification catalyst. Subsequently, the obtained complete cellulose acylate may be saponification-aged at 50 to 90 degrees Celsius in the presence of a small amount of acetylation reaction catalyst, usually residual sulfuric acid, to change a cellulose acylate having a desired acylation degree and a desired polymerization degree. At the time of formation of desired cellulose acylate, the reaction solution may be poured into water or dilute sulfuric acid, if necessary, after being neutralized the residual catalyst with the above-mentioned neutralizing agent completely, to separate cellulose acylate. After being dried and stabilization-treated, the desired cellulose acylate may be obtained.

The second optically anisotropic layer is desirably a polymer film substantially formed of the above-mentioned cellulose acylate. The term of "substantially formed of the above-mentioned cellulose acylate" means that not less than 55% of polymer ingredient is in the film the above-mentioned cellulose acylate, desirably not less than 70% and more desirably not less than 80% of polymer ingredient in the film is the above-mentioned cellulose acylate.

As material for preparation of the film, particles of cellulose acylate are desirably used. It is desired that not less than 90% by mass of the particles have a particle diameter falling within a range from 0.5 to 5 mm, and it is also desired that not less than 50% by mass of the particles has a particle diameter falling within a range from 1 to 4 mm. Cellulose acylate particles in a spherical shape may be desirably used.

The polymerization degree, here viscosity-average polymerization degree, of the cellulose acylate which can be used in the present invention is desirably from 200 to 700, more desirably from 250 to 550, much more desirably from 250 to 400 and further much more desirably from 250 to 300. The viscosity-average polymerization degree can be measured according to Uda's limiting viscosity method, described in Journal of The Society of Fiber Science and Technology, Japan, vol. 18, p. 105 to 120, 1962, Uda Kazuo and Saitoh Hideo. The method is also described in Japanese Laid-Open Patent Publication No. Hei 9-95538.

As removed low-molecular weight ingredient, cellulose acylate may have a low viscosity, in spite of having a high average polymerization degree, compared with usual cellulose acylate, and thus such cellulose acylate is useful. The low-molecular weight ingredients can be remove by washing cellulose acylate with any proper organic solvent. When cellulose acylate containing small amount of low-molecular ingredients is produced, the acylation reaction may be desirably carried out with 0.5 to 25 mass parts of sulfuric acid catalyst with respect to 100 mass parts of cellulose. When the sulfuric acid catalyst is used in the above mentioned amount, cellulose acylate having a good molecular-weight distribution, uniform molecular-weight distribution, can be obtained.

The cellulose acylate which can be used in the present invention desirably has a moisture content of not greater than 2% by mass, more desirably not greater than 1 & by mass, and much more desirably not greater than 0.7% by mass. Cellulose acylate usually contains 2.5 to 5% by mass of water, and in order to have the moisture content falling within the desired range, cellulose acylate is required to be dried. Any methods can be used for drying cellulose acylate.

Material cottons and producing processes of cellulose acylates which can be desirably used in the present invention are described on pages 7 to 12 in Kokai Giho No. 2001-1745 published in Mar. 5, 2001, by of Japan Institute of Invention and Innovation.

[Fixation of Orientation State of Liquid-Crystalline Compound]

When the first and second optically-anisotropic layers are produced by using liquid-crystalline molecules, it is preferable to fix the oriented liquid-crystalline molecules while keeping the oriented state unchanged. The fixation is preferably effected through polymerization reaction of the polymerizable group introduced into the liquid-crystalline molecules. Examples of such polymerization reaction include heat polymerization using a heat polymerization initiator, and photo-polymerization reaction using a photo-polymerization initiator, where the latter is more preferable. Examples of the photo-polymerization initiator include α-carbonyl compounds (described in the patent specifications of U.S. Pat. Nos. 2367661 and 2367670), acyloin ethers (descried in the patent specification of U.S. Pat. No. 2,448,828), α-hydrocarbon-substituted aromatic acyloin compounds (descried in the patent specification of U.S. Pat. No. 2,722,512), polynuclear quinone compounds (descried in the patent specifications of U.S. Pat. Nos. 3,046,127 and 2,951,758), combinations of triaryl imidazole dimer and p-aminophenylketone (descried in the patent specification of U.S. Pat. No. 3,549,367), acridine and phenazine compounds (descried in the patent specifications of Japanese Laid-Open Patent Publication No. 60-105667 and U.S. Pat. No. 4,239,850) and oxadiazole compounds (descried in the patent specification of U.S. Pat. No. 4,212,970).

Amount of use of the photo-polymerization initiator is preferably 0.01 to 20% by mass, and more preferably 0.5 to 5% by mass, on the solid bases of the coating liquid. Photo irradiation for the polymerization of the liquid-crystalline compound preferably uses ultraviolet radiation. Irradiation energy preferably falls within a range from 20 to 50 $J/cm^2$, and more preferably 100 to 800 $mJ/cm^2$. It is also allowable to carry out the photo-irradiation under a heating condition. Thickness of the optically-anisotropic layer is preferably adjusted to 0.1 to 10 μm, and more preferably 0.5 to 5 μm.

The optically-anisotropic layer is preferably formed by applying a coating solution, which contains at least one liquid-crystalline compound, above-described polymerization initiator and other additives, on a surface of an alignment layer. Organic solvents are preferably used as a solvent for preparing the coating solution, and examples of which include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), ester (e.g., methyl acetate, butyl acetate), ketones (e.g., acetone, methylethylketone), and ethers (e.g., tetrahydrofuran, 1,2-dimethoxyethane). In particular, alkyl halides and ketones are preferable. It is also allowable to use two or more species of the solvents in combination. The coating liquid can be coated by any publicly-known methods (e.g., extrusion coating, direct gravure coating, reverse gravure coating, die coating).

[Alignment Layer]

When the first and second optically-anisotropic layers are produced by using the liquid-crystal compound, it is preferable to use an alignment layer for the purpose of aligning liquid-crystalline molecules. The alignment layer can be produced by rubbing a layer formed of an organic compound (preferably polymer), oblique-angled vapor deposition of an inorganic compound, formation of a layer having a microgroup, or accumulation of an organic compound (e.g., ω-tricosane, dioctadecyldimethylammonium chloride, methyl stearylate) based on Langmuir-Blodgett process (LB film). There are also known layers exhibiting a property capable of aligning molecules upon being applied with magnetic field or irradiated by light. The alignment layer produced by rubbing of a polymer layer is particularly preferable. The rubbing is proceeded by rubbing the surface of the polymer layer several times with paper or cloth in one direction.

Species of polymer used for composing the alignment layer can be determined depending on a desired orientation (in particular, average tilt angle) of the liquid-crystalline compound. For example, homogenous alignment of the liquid-crystalline molecules will be obtained by using a polymer (general polymer for orientation) not causative of lowering of surface energy of the alignment layer. Specific examples of the polymer are described in various literatures on the liquid crystal cell and optical compensatory sheet. In particular for the case where the liquid-crystalline compound is oriented in the direction normal to the rubbing direction, examples of the polymer preferably used in the present invention include modified polyvinyl alcohol described in Japanese Laid-Open Patent Publication No. 2002-62427, acrylate-base copolymer described in Japanese Laid-Open Patent Publication No. 2002-98836, and polyimide and polyamic acid described in Japanese Laid-Open Patent Publication No. 2002-268068. Any of these alignment layers preferably has a polymerizable group for the purpose of improving adhesiveness between the liquid/crystalline compound and transparent support. The polymerizable group can be introduced by using a repetitive unit having such polymerizable group in the side chain thereof, or as a substituent of a cyclic group. It is more preferable to use an alignment layer capable of forming a chemical bond with the liquid-crystalline compound at the interface, and this type of the alignment layer is described in Japanese Laid-Open Patent Publication No. 9-152509.

Thickness of the alignment layer preferably falls within a range from 0.01 to 5 μm, and more preferably 0.05 to 2 μm.

It is also allowable that the liquid-crystalline molecules are oriented using the alignment layer, the optically-anisotropic layer is produced while keeping the orientation state of the liquid-crystalline compound unchanged, and transfer only the optically-anisotropic layer onto a polymer film (or the transparent support).

The next paragraphs will detail the polarizer film used for the liquid crystal display device of the present invention.

[Polarizer Film]

The polarizer film applicable to the present invention is not specifically limited, and any publicly-known ones can be used. Available examples include films which are composed of hydrophilic polymers such as polyvinyl alcohol and partially formal-modified polyvinyl alcohol and partially saponified ethylene/vinyl acetate copolymer, adsorbed with a dichroic substance such as iodine and/or azo-base, anthraquinone-base, tetrazine-base dichroic dyes, and subjected to stretching orientation. In the present invention, it is preferable to adopt a stretching method described in Japanese Laid-Open Patent Publication No. 2002-131548, and it is particularly preferable to use a tenter stretching machine of the width-wise uniaxial stretching type characterized in that the absorption axis of the polarizer film cross substantially normal to the longitudinal direction of the film. Use of the tenter stretching machine of the width-wise uniaxial stretching type makes it possible to use a general alignment layer as the alignment layer used on the first optically-anisotropic layer, while making it no more necessary to use a special alignment layer for orienting the liquid-crystalline compound normal to the rubbing direction. This is advantageous in terms of cost and orientation-derived defects.

The polarizer film is generally used as a polarizer plate as being protected with a transparent protective film (also simply referred to as protective film) on at least one surface. Species of the transparent protective film are not specifically limited, and available examples include cellulosic esters such as cellulose acetate, cellulose butylate, cellulose acetate butylate and cellulose propionate; polycarbonate; polyolefins; polystyrene; and polyester.

The transparent protective film is generally supplied in a rolled product form, and is preferably bonded with the long polarizer film in a continuous manner so as to align their longitudinal directions. The orientation axis (slow axis) of the transparent protective film herein may be directed in any direction, but preferably in parallel to the longitudinal direction for simplicity in the operation. Also there is no special limitation on the angle between the slow axis (orientation axis) of the transparent protective film and the absorption axis (axis of stretching) of the polarizer film, and can appropriately be determined depending on purposes of the polarizer film.

For the case where the polarizer film is fabricated using the aforementioned tenter stretching machine of the widthwise uniaxial stretching type, which is preferably applicable to the present invention, the slow axis (orientation axis) of the transparent protective film and the absorption axis (axis of stretching) of the polarizer film will cross substantially normal to each other.

Retardation value of the transparent protective film is preferably adjusted typically to 10 nm or smaller, and more preferably 5 nm or smaller, at 632.8 nm. In view of such low retardation, polymers preferably used for the transparent protective film may be polyolefins such as cellulose triacetate, Zeonex, Zeonor (both are products of Zeon Corporations) and Arton (product of JSR Corporation). Other available examples include non-birefringent optical resin materials such as those described in Japanese Laid-Open Patent Publication No. 8-110402 or in No. 11-293116. For the case where cellulose acetate is used for the transparent protective film, the retardation value is preferably adjusted to less than 3 nm, and more preferably less than 2 nm, for the purpose of minimizing fluctuation in the retardation value affected by environmental temperature and humidity.

In the present invention, either one of the protective films on the polarizer film may also serves as a support of the optically-anisotropic layer, or may be an optically-anisotropic layer in its entirety. The optically-anisotropic layer and polarizer film are preferably stacked by bonding for the purpose of preventing displacement of the optical axes, and of preventing dust or other foreign matter from entering. A proper adhesion process while placing a transparent adhesion layer in between, for example, is applicable for the stacking-by-bonding. There is no special limitation on types of the adhesive, where those not in need of high-temperature process for the curing and drying in the adhesion process, and not in need of curing and drying for a long duration of time are preferable in view of preventing optical characteristic of the component members from being varied. From this viewpoint, hydrophilic polymer-base adhesive and tacking layer are preferably used.

The tacking layer can be formed by using a transparent tacking agent composed of an appropriate polymer such as acrylic polymer, silicone polymer, polyester, polyurethane, polyether and synthetic rubber. Of these, acrylic tacking agent is preferable in view of optical transparency, tacking property and weatherability. It is also allowable to dispose the tacking layer on one surface or both surfaces of the polarizer plate for the purpose of adhesion to some adhesion target such as liquid crystal cell. For the case where the tacking layer is exposed to the top surface, it is preferable to temporarily place thereon a separator or the like so as to prevent contamination or the like of the surface of the tacking layer, until it is brought into practical use.

It is also preferable to use the polarizer plate comprising a polarizer film having, formed on one surface of which or on both surfaces of which, a protective film which assimilates the above-described transparent protective film and has various purposes such as water proofing, or appropriate functional layers such as anti-reflection film and/or antiglaring layer for the purpose of preventing surface reflection. The anti-reflection film can properly be formed typically as a coated layer of a fluorine-containing polymer or as a light interfering film typically composed of a multi-layered, vapor-deposited metal film. The anti-glaring film can properly be formed by any appropriate techniques capable of causing spreading of surface reflection light, where the techniques include use of a resin coated layer containing fine particles, and formation of a fine irregular structure on the surface through an appropriate process such as embossing, sand blasting and etching.

The above-described fine particle may be of a single material or a combination of two or more materials having a mean particle size of 0.5 to 20 μm properly selected from inorganic fine particles such as silica, calcium oxide, alumina, titania, zirconia, tin oxide, indium oxide, cadmium oxide and antimony oxide which may have conductivity under some circumstance; and crosslinked or non-closslinked polymers such as polymethyl methacrylate and polyurethane. It is still also allowable to design the adhesive layer and tacking layer as containing the above-described fine particles so as to exhibit light spreading property.

[Optical Characteristics of Polarizer Plate]

Optical properties and durability (short-term and long-term storability) of the polarizer plate used in the present invention, which comprises the transparent protective film, polarizer film and transparent support, are preferably equivalent to, or superior to those of any commercial super-high-contrast products (e.g., HLC2-5618 manufactured by Sanritz Corporation). More specifically, preferable specifications relate to a visible light transmissivity of 42.5% or above; a degree of polarization $\{(Tp-Tc)/(Tp+Tc)\}^{1/2}$ of 0.9995 or above (where, Tp is a parallel transmissivity, and Tc is a vertical transmissivity); a ratio of variation in the light transmissivity after being allowed to stand at 60° C., 90% RH for 500 hours, and then at 80° C. in dryness for 500 hours of 3% or less on the basis of absolute value, more preferably 1% or less; and a ratio of variation in the degree of polarization of 1% or less on the basis of absolute value, and more preferably 0.1% or less.

EXAMPLES

The following paragraphs will further detail the present invention referring to specific examples. It is to be noted that any materials, reagents, amount or ratio of use, operations and so forth can properly be altered without departing from the spirit of the present invention. Therefore the scope of the present invention is by no means limited to the specific examples described below.

Example 1-1

A liquid crystal display device having a configuration shown in FIG. 1 was fabricated. It is to be noted that only one layer of the second optically-anisotropic layer was provided (that is, second optically-anisotropic layer 12 in FIG. 1 is omitted). More specifically, the upper polarizer plate 1, the liquid crystal cell (upper substrate 5, liquid crystal layer 7, lower substrate 8), and the lower polarizer plate 14 were stacked in this order as viewed from the viewing direction (upper layer), and a backlight source (not shown) was further provided. Individually between the upper and lower polarizer plates and the liquid crystal cell, the first optically-anisotropic layer 3 and second optically-anisotropic layer 10 for raising the optical characteristics of the liquid crystal display device were disposed respectively. The upper polarizer plate 1 and lower polarizer plate 14 used herein were those having a configuration shown in FIG. 2, comprising a protective film 101, a polarizer film 103 and a protective film 105 (the protective film 105 disposed closer to the liquid crystal cell). The upper polarizer plate 1 was incorporated into the liquid crystal display device after being fabricated as an integrated upper polarizer plate, in which the protective film 105 was also used as a transparent support for the first optically-anisotropic layer 3 so as to be integrated with the first optically-anisotropic layer 3. On the other hand, the lower polarizer plate 14 was configured so that the protective film 105 also functions as the second optically-anisotropic layer 10.

Methods of fabricating the individual members used herein will be described below.

<Fabrication of Liquid Crystal Cell>

The liquid crystal cell was fabricated according to the following procedures. A polymer solution for preparing an alignment layer (e.g., JALS204R, product of JSR Corporation) was applied on the surface of a substrate, and then rubbed so as to adjust the director, so-called tilt angle which indicates the direction of orientation of the liquid crystal molecules with respect to the surface of the substrate, of approximately 89°. A gap between the upper and lower substrates was adjusted to 3.5 μm, into which a liquid crystal (e.g., MLC-6608, product of Merck) having a negative dielectric anisotropy, Δn=0.0813 and Δε=−4.6 or around, was dropwisely injected and encapsulated.

<Fabrication of Integrated Upper Polarizer Plate>

The polarizer film was fabricated by allowing iodine to be adsorbed onto a stretched polyvinyl alcohol film.

A saponified commercial cellulose triacetate film (Fujitac TD80UF, product of Fuji Photo Film Co., Ltd.) was used as the transparent protective film (element 101 in FIG. 2) on the side more distant from the liquid crystal cell. The protective film was found to have Re of 3 nm and Rth of 50 nm. On the other hand, transparent protective support A fabricated and saponified according to the procedures described in the next was used as the transparent protective film (element 105 in FIG. 2) on the side closer to the liquid crystal cell.

(Fabrication of Transparent Support A)

The composition shown below was placed into a mixing tank, stirred under heating so as to solubilize the individual components, to thereby prepare a cellulose acetate solution.

| Composition of Cellulose Acetate Solution | |
|---|---|
| Cellulose acetate (degree of acetylation = 60.7 to 61.1%) | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |

In a separate mixing tank, 16 parts by mass of the retardation enhancer shown below, 92 parts by mass of methylene chloride and 8 parts by mass of methanol were placed, and stirred under heating, to thereby prepare a retardation enhancer solution. Twenty-five parts by mass of the retardation enhancer solution was then added to 474 parts by mass of a cellulose acetate solution, and thoroughly stirred to thereby prepare a dope. Amount of addition of the retardation enhancer was 3.5 parts by mass relative to 100 parts by mass of cellulose acetate.

Retardation Enhancer

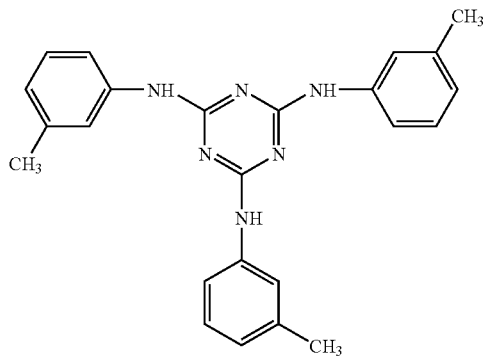

The obtained dope was flow cast on a band stretching machine. After a film temperature on the band reached 40° C., the film was dried with a hot air of 70° C. for 1 minute, further dried from the band side with a dry hot air of 140° C. for 12 minutes, to thereby prepare a cellulose acetate film having a residual solvent content of 0.3% by mass (80 μm thick). The obtained cellulose acetate film was measured for Re value and Rth value at a wavelength of 550 nm using an ellipsometer (M-150, manufactured by JASCO Corporation). Re was found to be 2 nm (variation=±1 nm), and Rth was found to be 120 nm (variation=±3 nm). It was also found that Re in a wavelength range from 400 nm to 700 nm was 2±1 nm, and Rth in a wavelength range from 400 nm to 700 nm was 120±2 nm.

Thus-produced cellulose acetate film was immersed into a 2.0 N potassium hydroxide solution (25° C.) for 2 minutes, neutralized with sulfuric acid, washed with pure water, and then dried. Surface energy of the cellulose acetate film was measured by the contact method, and was found to be 63 mN/m. Thus-fabricated cellulose acetate film was named "transparent support A".

(Formation of Alignment Layer)

A coating solution having the composition shown below was applied to the opposite surface of thus-fabricated transparent support A using a #15 wire bar coater in an amount of 26.3 ml/m².

| Composition of Coating Solution for Alignment layer | |
|---|---|
| Polymer Compound P shown below | |

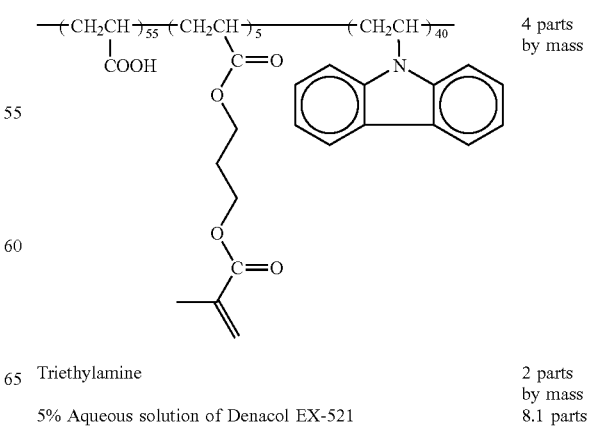

| | |
|---|---|
| | 4 parts by mass |
| Triethylamine | 2 parts by mass |
| 5% Aqueous solution of Denacol EX-521 | 8.1 parts |

-continued

| Composition of Coating Solution for Alignment layer | |
|---|---|
| (epoxy compound, product of Nagase ChemteX Corporation)) | by mass |
| Water | 57 parts by mass |
| Methanol | 29 parts by mass |

The coated film was dried at 25° C. for 30 seconds, and further with a hot air of 120° C. for 120 seconds. Thickness of the dried alignment layer was found to be 1.0 μm. Surface roughness of the alignment layer observed under an atomic force microscope (AFM, SPI3800N, product of Seiko Instruments Inc.) was 1.135 nm. Thus-formed film was then rubbed in the same direction with the slow axis of the transparent support A (longitudinal direction: measured at 550 nm).

(Fabrication of First Optically-Anisotropic Layer)

On thus-formed alignment layer, the first optically-anisotropic layer was formed. More specifically, on the above-described alignment layer, a coating solution having the composition shown below was continuously coated using a bar coater, dried, and heated (orientation ageing), and further irradiated by ultraviolet radiation, to thereby form a homogenously aligned first optically-anisotropic layer of 0.5 μm thick.

Composition of Coating Solution for First Optically-Anisotropic Layer

| | |
|---|---|
| Rod-like, liquid-crystalline compound (Exemplary compound I-2) | 38.1% by mass |
| Sensitizer A shown below | |

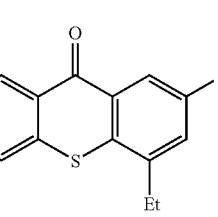

| | |
|---|---|
| | 0.38% by mass |

Photo-polymerization initiator B shown below

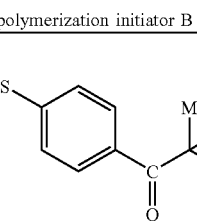

| | |
|---|---|
| | 1.14% by mass |

Alignment control agent C shown below

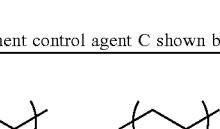

| | |
|---|---|
| | 0.19% by mass |
| Glutaraldehyde | 0.04% by mass |
| Methyl ethyl ketone | 60.1% by mass |

Thus-produced first optically-anisotropic layer 3 had the slow axis 4 in the direction normal to the longitudinal direction (rubbing direction) of the transparent support A, and was found to have Re value of 60 nm at 550 nm. It had a positive optical anisotropy, and was found to have Revalue over the entire visible light range of 64±7 nm.

Thus-fabricated stack of the transparent support A and the first optically-anisotropic layer, and the above-described cellulose triacetate film Fujitac TD80UF were respectively bonded onto both surfaces of the polarizer film using a polyvinyl alcohol-base adhesive, to thereby fabricate the integrated upper polarizer plate. In FIG. 2, the transparent protective film 101 more distant from the liquid crystal cell corresponds to Fujitac TD80UF, and the transparent protective film 105 closer to the liquid crystal cell corresponds to the transparent support A. Assuming now that angle of stacking of the individual layers is represented while defining the lateral direction in a top view of the display device as a reference (0°), angle of the slow axes 102, 106 of the upper polarizer plate protective film was adjusted to 90°, and angle of the absorption axis 104 (element 2 in FIG. 1) of the polarizer film was again adjusted to 90°.

Thus-fabricated integrated upper polarizer plate which comprises the upper polarizer plate 1 and the first optically-anisotropic layer 3 was incorporated into the liquid crystal display device so that the first optically-anisotropic layer 3 is disposed closer to the upper liquid crystal cell substrate 5.

<Fabrication of Lower Polarizer Plate>

A polarizer film which was produced in the same manner as that used in the above-fabricated upper polarizer plate was used. Similarly to the case of the upper polarizer plate, a saponified commercial cellulose triacetate film (Fujitac TD80UF, product of Fuji Photo Film Co., Ltd.) was used as the transparent protective film (element 101 in FIG. 2) on the side more distant from the liquid crystal cell. On the other hand, again similarly to the case of the upper polarizer plate, transparent protective plate A fabricated as described in the above was used as the transparent protective film (element 105 in FIG. 2) on the side closer to the liquid crystal cell. Two types of the protective films were then respectively laminated on the surfaces of the polarizer film using the adhesive similar to that described in the above. Assuming now that angle of stacking of the individual layers is represented while defining the lateral direction in a top view of the display device as a reference (0°), angle of the absorption axis 104 (element 15 in FIG. 1) of the polarizer film was again adjusted to 0°, and angle of the slow axes 102, 106 of the protective film was adjusted to 0°.

The transparent support A was found to have an optically negative refractive anisotropy, and optical characteristics in the visible light range characterized by Re=2 nm and Rth=120 nm, and functioned also as the second optically-anisotropic layer. Thus-fabricated polarizer plate comprising two protective films and the polarizer film was used as the integrated lower polarizer plate, which corresponds to the lower polarizer plate 14 in FIG. 1 as being integrated with the second optically-anisotropic layer 10. Thus-fabricated lower polarizer plate 3 was incorporated into the liquid crystal display device so that the second optically-anisotropic layer 10 is disposed closer to the lower liquid crystal cell substrate 8.

<Measurement of Leakage Light From Fabricated Liquid Crystal Display Device>

Viewing angle dependence of transmissivity of thus-fabricated liquid crystal display device was measured. Measurement was made while varying the angle of elevation from the front towards oblique direction of 80° at 10° intervals, and while varying the azimuth angle over 360° at 10° intervals, assuming the horizontal rightward direction (0°) as a reference. It was found that luminance in the black display mode increased as the angle of elevation increased from the front direction due to increase in the light leakage transmissivity, and reached maximum at an angle of elevation of 60° or around. It was also found that increase in the black display transmissivity degraded contrast ratio which expresses ratio of white display transmissivity and black display transmissivity. The present inventors therefore decided to evaluate the viewing angle characteristics based on the vertical black display transmissivity and maximum leakage light transmissivity at an angle of elevation of 60°.

The vertical transmissivity in this Example was found to be 0.02%, and the maximum leakage light transmissivity at an angle of elevation of 60° was 0.05% at an azimuth angle of 30°. This means that the vertical contrast ratio is 500:1, and the contrast ratio at an angle of elevation of 60° is 200:1.

Example 1-2

A liquid crystal display device having a configuration shown in FIG. 1 was fabricated. It is to be noted that only one layer of the second optically-anisotropic layer was provided (that is, second optically-anisotropic layer 12 in FIG. 1 is omitted). More specifically, the upper polarizer plate 1, the liquid crystal cell (upper substrate 5, liquid crystal layer 7, lower substrate 8), and the lower polarizer plate 14 were stacked in this order as viewed from the viewing direction (upper layer), and a backlight source (not shown) was further provided. Individually between the upper and lower polarizer plates and the liquid crystal cell, the first optically-anisotropic layer 3 and second optically-anisotropic layer 10 for raising the optical characteristics of the liquid crystal display device were disposed. The upper polarizer plate 1 and lower polarizer plate 14 used herein were those having a configuration shown in FIG. 2, comprising the protective film 101, the polarizer film 103 and the protective film 105 (the protective film 105 disposed closer to the liquid crystal cell). The upper polarizer plate 1 was incorporated into the liquid crystal display device after being fabricated as an integrated upper polarizer plate, in which the protective film 105 was also used as a transparent support for the first optically-anisotropic layer 3 so as to be integrated with the first optically-anisotropic layer 3. On the other hand, the lower polarizer plate 14 was incorporated into the liquid crystal display device after being fabricated as an integrated lower polarizer plate, in which the protective film 105 was also used as a transparent support for the second optically-anisotropic layer 10 so as to be integrated with the second optically-anisotropic layer 10.

The liquid crystal cell and the polarizer film used herein were same as those used above in Example 1-1.

As a protective film for the upper and lower polarizer films, a commercial cellulose triacetate film (Fujitac TD80UF, product of Fuji Photo Film Co., Ltd., Re=3 nm, Rth=50 nm) was used, similarly to as described in Example 1-1.

<Fabrication of Integrated Upper Polarizer Plate>

On Fujitac TD80UF (Re=3 nm, Rth=50 nm) saponified similarly to as described for the transparent support in Example 1-1, the alignment layer and the first optically-anisotropic layer 3 were formed. The first optically-anisotropic layer 3 herein was formed by aligning the rod-like, liquid-crystalline molecules (so that the slow axis thereof cross normal to the slow axis of the support) similarly to as described in Example 1-1, except that the Re value at 550 nm of the first optically-anisotropic layer is set to 85 nm, and the Rth value in the visible light region is set to 91±9 nm (0.7 µm) thick. The first optically-anisotropic layer showed an optically positive refractive anisotropy.

Thus-fabricated stack of Fujitac TD80UF and first optically-anisotropic layer 3, and Fujitac TD80UF were respectively laminated onto both surfaces of the polarizer film using a polyvinyl alcohol-base adhesive, to thereby fabricate the integrated upper polarizer plate. The integrated upper polarizer plate was incorporated into the liquid crystal display device so that the first optically-anisotropic layer 3 is disposed closer to the upper liquid crystal cell substrate 5.

<Fabrication of Integrated Lower Polarizer Plate>

(Fabrication of Alignment layer Layer)

A coating liquid having the composition shown below was coated on the surface of Fujitac TD80UF (Re=3 nm, Rth=50 nm) saponified similarly to as described for the transparent support in Example 1-1, using a #16 wire bar coater in an amount of 28 ml/m².

Composition of Coating Liquid for Alignment layer
Modified polyvinyl alcohol shown below

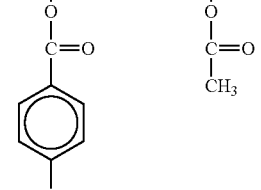

| | |
|---|---|
| Water | 361 parts by mass |
| Methanol | 119 parts by mass |

Glutaraldehyde (crosslinking agent) 0.5 parts by mass

The coated film was dried at 25° C. for 60 seconds, and further with a hot air of 90° C. for 150 seconds. Thickness of the dried alignment layer was found to be 1.1 µm. Surface roughness of the alignment layer observed under an atomic force microscope (AFM, SPI3800N, product of Seiko Instruments Inc.) was 1.147 nm. Thus-formed layer was then rubbed in the same direction with the slow axis of Fujitac TD80UF.

(Formation of Second Optically-Anisotropic Layer)

On the rubbed alignment layer, a coating solution containing a discotic liquid crystal and having the composition shown below was coated.

| Composition of Coating Liquid of Discotic liquid Crystal | |
|---|---|
| Discotic liquid-crystalline compound (1) *1 | 32.6% by mass |
| Cellulose acetate butylate | 0.7% by mass |
| Ethylene oxide-modified trimethylolpropane triacrylate (V#360, product of Osaka Organic Chemical Industry, Ltd.) | 3.2% by mass |
| Sensitizer (Kayacure DETX, product of Nippon Kayaku Co., Ltd.) | 0.4% by mass |

-continued

| Composition of Coating Liquid of Discotic liquid Crystal | |
|---|---|
| Photo-polymerization initiator (Irgacure 907, product of Ciba-Geigy Corporation) | 1.1% by mass |
| Methyl ethyl ketone | 62.0% by mass |

*1: 1,2,1',2',1",2"-tris[4,5-di(vinylcarbonyloxy butoxybenzoyloxy)phenylene (Exemplary Compound TE-8-(8), m = 4, disclosed in Japanese Laid-Open Patent Publication No. 8-50206, paragraph [0044]) was used as the discotic liquid-crystalline compound (1).

The coated film was then dried under heating in a heating zone at 130° C. for 2 minutes, to thereby orient the discotic liquid-crystalline compound. The discotic liquid-crystalline compound was then polymerized by UV irradiation at 130° C. for 4 seconds using a 120-W/cm high-pressure mercury lamp. The film was then allowed to stand for cooling to room temperature, to thereby form the second optically-anisotropic layer of 1.4 μm thick, having an optically negative refractive anisotropy, and having values of Re=0 nm and Rth=140 nm in the visible light range. The discotic liquid-crystalline compound of the second optically-anisotropic layer was found to be homeotropic aligned with a tilt angle of ±2°.

Thus-fabricated stack of Fujitac TD80UF and second optically-anisotropic layer and Fujitac TD80UF were respectively bonded onto both surfaces of the polarizer film using a polyvinyl alcohol-base adhesive, to thereby fabricate the integrated lower polarizer plate.

In thus-fabricated integrated lower polarizer plate, angle of the slow axis 11 o the second optically-anisotropic layer 10 was same as that of the slow axis (element 106 in FIG. 2) of the transparent protective film (element 105 in FIG. 2) in close adjacent to the second optically-anisotropic layer 10. Thus-fabricated integrated lower polarizer plate was incorporated into the liquid crystal display device so that the second optically-anisotropic layer 10 is brought into contact with the upper liquid crystal cell substrate 8.

Other configurations of the liquid crystal display device were same as those in Example 1-1.

<Measurement of Leakage Light from Fabricated Liquid Crystal Display Device>

Viewing angle characteristic of leakage light in the black display mode of thus-fabricated liquid crystal display device was measured similarly to as described in Example 1-1. The vertical transmissivity in this Example was found to be 0.02%, and the maximum leakage light transmissivity at an angle of elevation of 60° was 0.04% at an azimuth angle of 30°.

Example 1-3

The liquid crystal display device was fabricated similarly to as described in Example 1-2, except that the rod-like, liquid-crystalline compound used for the first optically-anisotropic layer is replaced with Exemplary Compound I-14 shown above. Measured value of the leakage light from thus-fabricated liquid crystal display device was same as that in Example 1-2.

Comparative Example 1-1

A liquid crystal display device was fabricated similarly to as described in Example 1-1, except that the integrated upper polarizer plate in Example 1-1 was fabricated without forming the first optically-anisotropic layer 3.

<Measurement of Leakage Light from Fabricated Liquid Crystal Display Device>

Viewing angle characteristic of leakage light in the black display mode of thus-fabricated liquid crystal display device was measured similarly to as described in Example 1-1. The vertical transmissivity in this Example was found to be 0.02%, and the maximum leakage light transmissivity at an angle of elevation of 60° was 0.035% at an azimuth angle of 45°.

It was shown that the Comparative Example 1-1 had a larger light leakage as compared with Examples 1-1, 1-2 and 1-3 of the present invention, and this proved superiority of the present invention.

Comparative Example 1-2

The upper polarizer plate was fabricated similarly to as described in Example 1-1, except that a film having Re of 36 nm and Rth of 173 nm was used as the transparent protective film of the upper polarizer plate 1, on the side closer to the liquid crystal cell, angle of the slow axis of the outer protective film of the upper polarizer plate 1 is set to 0°, angle of the absorption axis 2 of the polarizer film is set to 0°, angle of the slow axis of the protective film on the liquid-crystal-cell side is set to 90°, and the first optically-anisotropic layer 3 was not used.

Also the lower polarizer plate was fabricated similarly to as described in Example 1-1, except that a film having Re of 9 nm and Rth of 68 nm was used as the transparent protective film of the lower polarizer plate 14, on the side closer to the liquid crystal cell, angle of the slow axis of the outer protective film of the lower polarizer plate 14 is set to 90°, angle of the absorption axis 15 of the polarizer film is set to 90°, and angle of the slow axis of the protective film on the liquid-crystal-cell side is set to 0°.

The liquid crystal display device was fabricated similarly to as described in Example 1-1, except these upper and lower polarizer plates were used.

<Measurement of Leakage Light From Fabricated Liquid Crystal Display Device>

Viewing angle characteristic of leakage light in the black display mode of thus-fabricated liquid crystal display device was measured similarly to as described in Example 1-1. The vertical transmissivity in this Example was found to be 0.02%, and the maximum leakage light transmissivity at an angle of elevation of 60° was 0.17% at an azimuth angle of 30°.

It was shown that the Comparative Example 1-2 had a larger light leakage as compared with Examples 1-1, 1-2 and 1-3 of the present invention, and this proved superiority of the present invention.

Comparative Example 1-3

A liquid crystal display device having a configuration shown in FIG. 1 was fabricated. The polarizer plates 1,14 used herein were such as having a configuration shown in FIG. 2, and using a commercial cellulose triacetate film (Fujitac TD80UF, product of Fuji Photo Film Co., Ltd., Re=3 nm, Rth=50 nm) as the protective films 101, 105. One layer of retardation film C (element 3 in FIG. 1) was disposed between the upper polarizer plate 1 and upper liquid crystal cell substrate 5, and two layers of retardation films D (elements 10 and 12 in FIG. 1) were disposed between the lower polarizer plate 14 and lower liquid crystal cell substrate 8. Direction of the slow axis of the protective film on the polarizer plate, and absorption axis of the polarizer plate were set similarly to as described in Example 1-2.

The retardation film C comprises a norbornene-base stretched film, and has an average refractive index Nx in the direction of stretching of the film of 1.51, an average refractive index Ny in the direction normal to the direction of stretching of the film of 1.509, an average refractive index Nz of the thickness-wise direction of the film of 1.509, and a thickness of 95 μm. The Re value of the film was set to 95 nm, and the angle of the slow axis 4 thereof was set to 0°. Both of the retardation films D (10, 12) were composed of a norbornene-base stretched film, having an average refractive index Nx in the direction of stretching of the film of 1.51, an average refractive index Ny in the direction normal to the direction of stretching of the film of 1.51, an average refractive index Nz of the thickness-wise direction of the film of 1.5084, a thickness of 70 μm, Re of 5 nm, and Rth of 110 nm. These two films were stacked so that the slow axes thereof cross nearly normal to each other, and disposed so that the angle of the slow axis 13 of the film in contact with the lower polarizer plate was adjusted to 90°, and angle of the slow axis 10 of the film in contact with the liquid crystal cell was adjusted to 0°.

<Measurement of Leakage Light from Fabricated Liquid Crystal Display Device>

Viewing angle characteristic of leakage light in the black display mode of thus-fabricated liquid crystal display device was measured similarly to as described in Example 1-1. The vertical transmissivity in Comparative Example 1-3 was found to be 0.02%, and the maximum leakage light transmissivity at an angle of elevation of 60° was 0.17% at an azimuth angle of 30°.

It was shown that the Comparative Example 1-3 had a larger light leakage as compared with Examples 1-1, 1-2 and 1-3 of the present invention and needed as much as three retardation films, and this proved superiority of the present invention.

Comparative Example 1-4

A liquid crystal display device configured similarly to as described in Comparative Example 1-3 was fabricated similarly to as described in Comparative Example 1-3, except that an optically-anisotropic layer E composed of a coated cholesteric liquid-crystalline compound was used in place of the retardation films D (10, 12).

The optically-anisotropic layer E was formed referring to a method described in Japanese Laid-Open Patent Publication No. 2002-311243, in which the rod-like, liquid-crystalline compound (Exemplary Compound I-2) was given with optical activity by adding a chiral agent D shown below, to thereby allow it to function as a cholesteric layer. The layer having a thickness of 4 μm was found to have Re of 3 nm, Rth of 250 nm, and a pitch of the cholesteric liquid crystal of 130 nm. Thus-fabricated, optically-anisotropic layer E was disposed so as to adjust angle of the slow axis to 0° with respect to the lower polarizer plate.

Chiral Agent D (polymerizable chiral agent having isosorbid nucleus)

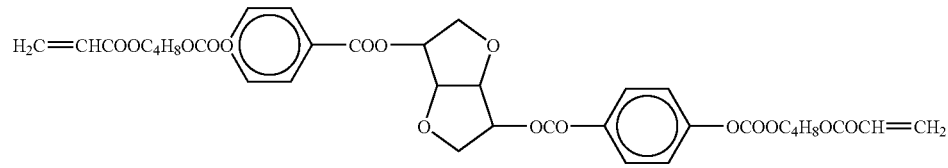

<Measurement of Leakage Light From Fabricated Liquid Crystal Display Device>

Viewing angle characteristic of leakage light in the black display mode of thus-fabricated liquid crystal display device was measured similarly to as described in Example 1-1. The vertical transmissivity in this Comparative Example 1-4 was found to be 0.05%, and the maximum leakage light transmissivity at an angle of elevation of 60° was 0.17% at an azimuth angle of 30°.

It was shown that the Comparative Example 1-4 had a larger light leakage as compared with Examples 1-1, 1-2 and 1-3 of the present invention, and needed one extra retardation film as compared with the present invention, and this proved superiority of the present invention.

Example 1-4

A liquid crystal display device configured similarly to as shown in FIG. 1 was fabricated similarly to as described in Example 1-2, except that the polarizer film and the alignment layer of the first optically-anisotropic layer of the integrated upper polarizer plate were fabricated as described below.

(Fabrication of Polarizer Film)

A PVA film having an average degree of polymerization of 2400, and a thickness of 100 μm was washed with ion exchanged water of 15 to 17° C. for 60 seconds, scraped on the surface thereof with a stainless-steel-made blade so as to remove water, immersed in an aqueous solution containing 0.77/1 of iodine and 60.0 g/l of potassium iodide at 40° C. for 55 seconds while correcting the concentration so as to keep a constant level, then immersed in an aqueous solution containing 42.5 g/l of boric acid and 30 g/l of potassium iodide at 40° C. for 90 seconds while correcting the concentration so as to keep a constant level, scraped on both surfaces thereof with a stainless-steel-made blade so as to remove excessive water to thereby keep water content of the film to 2% or less, and then introduced into a tenter stretching machine shown in FIG. 2 of Japanese Laid-Open Patent Publication No. 2002-131548. The film was stretched as long as five times at a feeding speed of 4 m/min and a length of feeding of 100 m under an atmosphere of 60° C., 95% RH, dried in 70° C. atmosphere while keeping the width constant, and separated from the tenter. Water content of the PVA film before stretching was 32%, and water content after the drying was 1.5%. No deformation of the film at the exit of the tenter was observed. Thickness of the film after the stretching and drying was found to be 18 μm.

Both edge portions of the stretched film as wide as 3 cm in the width-wise direction were slit off using a cutter, and on both surfaces of the film, saponified commercial cellulose triacetate films (Fujitac TD80UF, product of Fuji Photo Film Co., Ltd., Re=3 nm, Rth=50 nm) were bonded using a 3% aqueous solution of PVA (PVA-117H, product of Kuraray Co., Ltd.) as an adhesive, and heated at 70° C. for 10 minutes, to thereby obtain a polarizer plate having an effective width of 650 mm and having, on both surfaces of which, cellulose triacetate protective films.

Thus-obtained polarizer film was found to have the absorption axis 90° inclined away from the longitudinal direction. No color fading streak was observed by visual inspection.

(Fabrication of Alignment layer of First Optically-Anisotropic Layer)

An alignment layer same as that for the second optically-anisotropic layer described in Example 1-2 was formed on Fujitac TD-80UF, and the alignment layer was then rubbed in the direction same as the slow axis of Fujitac TD-80UF. The first optically-anisotropic layer 3 formed thereon similarly to as described in Example 1-2 was found to have the slow axis 4 in the direction parallel to the longitudinal direction (direction of rubbing) of Fujitac TD-80UF, Re at 550 nm of 8 nm and Re in the visible light region of 91±9 nm (0.7 μm thick). The second optically-anisotropic layer was found to be less in the number of defects as compared with Example 1-2.

<Measurement of Leakage Light From Fabricated Liquid Crystal Display Device>

Viewing angle characteristic of leakage light in the black display mode of thus-fabricated liquid crystal display device was measured similarly to as described in Example 1-1. The vertical transmissivity in this Example was found to be 0.02%, and the maximum leakage light transmissivity at an angle of elevation of 60° was 0.04% at an azimuth angle of 30°.

Example 1-5

A liquid crystal display device was produced in the same manner as Example 1-1, except that a transparent support B was used in the place of the transparent support A. Leakage light from the produced liquid crystal display device was measured in the same manner as Example 1-1. The vertical transmissivity in this Example was found to be 0.02%, and the maximum leakage light transmissivity at an angle of elevation of 60° was 0.06% at an azimuth angle of 30°.

(Fabrication of Transparent Support B)

The composition shown below was placed into a mixing tank, stirred under heating so as to dissolve the individual components, to thereby prepare a cellulose acetate propionate solution.

| Composition of Cellulose Acetate Propionate Solution | |
|---|---|
| Cellulose acetate propionate ("CAP-482-20" manufactured by EASTMAN CHEMICAL, CO. LTD.) | 100 parts by mass |
| Triphenyl phosphate (plasticizer) | 3.9 parts by mass |
| Biphenyl diphenyl phosphate (plasticizer) | 1.9 parts by mass |
| Methylene chloride (first solvent) | 317 parts by mass |
| Methanol (second solvent) | 28 parts by mass |
| Silica (particle diameter of 0.2 micro meters) | 0.1 parts by mass |

In a separate mixing tank, 16 parts by mass of the retardation enhancer shown below, 92 parts by mass of methylene chloride and 8 parts by mass of methanol were placed, and stirred under heating, to thereby prepare a retardation enhancer solution 01.

Twenty-five parts by mass of the retardation enhancer solution 01 was then added to 474 parts by mass of a cellulose acetate propionate solution, and thoroughly stirred to thereby prepare a dope. Amount of addition of the retardation enhancer was 3.5 parts by mass relative to 100 parts by mass of cellulose acetate propionate. The cellulose acetate propionate used in the example had an acetylation degree "A" of 0.18 and a $C_3$ acylation degree "B" of 2.47, and thus satisfied the formula (C). The acylation degrees were measured by the above mentioned method.

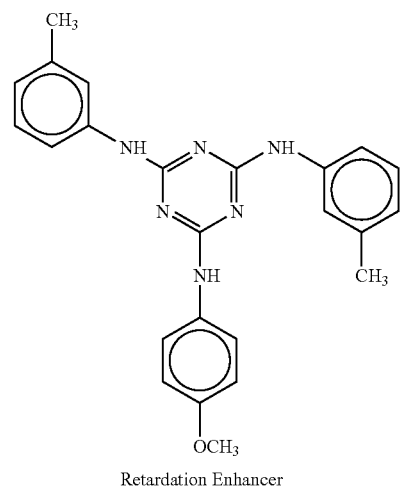

Retardation Enhancer

The obtained dope was flow cast on a band stretching machine in the same manner as Example 1-1. The obtained cellulose acetate propionate film was measured for Re value and Rth value at a wavelength of 550 nm using an ellipsometer (M-150, manufactured by JASCO Corporation). Re was found to be 2 nm (variation=±1 nm)), and Rth was found to be 125 nm (variation=±3 nm). It was also found that Re in a wavelength range from 400 nm to 700 nm was 2±1 nm, and Rth in a wavelength range from 400 nm to 700 nm was 125±2 nm.

Thus-produced cellulose acetate propionate film was immersed into a 2.0 N potassium hydroxide solution (25° C.) for 2 minutes, neutralized with sulfuric acid, washed with pure water, and then dried. Surface energy of the cellulose acetate propionate film was measured by the contact method, and was found to be 63 mN/m. Thus-fabricated cellulose acetate propionate film was named "transparent support B".

Example 1-6

A liquid crystal display device was produced in the same manner as Example 1-1, except that a transparent support C was used in the place of the transparent support A. Leakage light from the produced liquid crystal display device was measured in the same manner as Example 1-1. The vertical transmissivity in this Example was found to be 0.02%, and the maximum leakage light transmissivity at an angle of elevation of 60° was 0.05% at an azimuth angle of 30°.

(Fabrication of Transparent Support C)

The composition shown below was placed into a mixing tank, stirred under heating so as to dissolve the individual components, to thereby prepare a cellulose acetate butyrate solution.

| Composition of Cellulose Acetate Butyrate Solution | |
|---|---|
| Cellulose acetate butyrate ("CAB-381-20" manufactured by EASTMAN CHEMICAL, CO. LTD.) | 100 parts by mass |
| Triphenyl phosphate (plasticizer) | 2.0 parts by mass |
| Biphenyl diphenyl phosphate (plasticizer) | 1.0 parts by mass |
| Methylene chloride (first solvent) | 309 parts by mass |
| Methanol (second solvent) | 27 parts by mass |
| Silica (particle diameter of 0.2 micro meters) | 0.1 parts by mass |

Twenty-three parts by mass of the retardation enhancer solution 01 was then added to 439 parts by mass of a cellulose acetate butyrate solution, and thoroughly stirred to thereby prepare a dope. Amount of addition of the retardation enhancer was 3.5 parts by mass relative to 100 parts by mass of cellulose acetate butyrate. The cellulose acetate butyrate used in this example had an acetylation degree "A" of 1.00 and an $C_4$ acylation degree "B" of 1.66, and thus satisfied the formula (C). The acylation degrees were measured by the above mentioned method.

The obtained dope was flow cast on a band stretching machine in the same manner as Example 1-1. The obtained cellulose acetate butyrate film was measured for Re value and Rth value at a wavelength of 550 nm using an ellipsometer (M-150, manufactured by JASCO Corporation). Re was found to be 2 nm (variation=±1 nm), and Rth was found to be 121 nm (variation=±3 nm). It was also found that Re in a wavelength range from 400 nm to 700 nm was 2±1 nm, and Rth in a wavelength range from 400 nm to 700 nm was 121±2 nm.

Example 2-1

A liquid crystal display device having a configuration shown in FIG. 1 was fabricated. It is to be noted that only one layer of the second optically-anisotropic layer was provided (that is, second optically-anisotropic layer 12 in FIG. 1 is omitted). More specifically, the upper polarizer plate 1, the liquid crystal cell (upper substrate 5, liquid crystal layer 7, lower substrate 8), and the lower polarizer plate 14 were stacked in this order as viewed from the viewing direction (upper layer), and a backlight source (not shown) was further provided. Individually between the upper and lower polarizer plates and the liquid crystal cell, the first optically-anisotropic layer 3 and second optically-anisotropic layer 10 for raising the optical characteristics of the liquid crystal display device were disposed. The upper polarizer plate 1 and lower polarizer plate 14 used herein were those having a configuration shown in FIG. 2, comprising a protective film 101, a polarizer film 103 and a protective film 105 (the protective film 105 disposed closer to the liquid crystal cell). The upper polarizer plate 1 was incorporated into the liquid crystal display device after being fabricated as an integrated upper polarizer plate, in which the protective film 105 was bonded with the first optically-anisotropic layer 3. On the other hand, the lower polarizer plate 14 was incorporated into the liquid crystal display device after being fabricated as an integrated lower polarizer plate, in which the protective film 105 was also used as a transparent support for the second optically-anisotropic layer 10 so as to be integrated with the second optically-anisotropic layer 10.

Methods of fabricating the individual members used herein will be described below.

<Fabrication of Liquid Crystal Cell>

The liquid crystal cell was fabricated according to the following procedures. An alignment layer (e.g., JALS204R, product of JSR Corporation) was coated on the surface of the substrate, and then rubbed so as to adjust the director, so-called tilt angle which indicates the direction of orientation of the liquid crystal molecules with respect to the surface of the substrate, of approximately 89°. A gap between the upper and lower substrates was adjusted to 3.5 μm, into which a liquid crystal (e.g., MLC-6608, product of Merck) having a negative dielectric anisotropy, Δn=0.0813 and Δε=−4.6 or around, was dropwisely injected and encapsulated.

<Fabrication of Integrated Upper Polarizer Plate>

(Fabrication of Upper Polarizer Plate)

The polarizer film was fabricated by allowing iodine to be adsorbed onto a stretched polyvinyl alcohol film.

Saponified commercial cellulose triacetate films (Fujitac TD80UF, product of Fuji Photo Film Co., Ltd.) were used as the transparent protective films for the polarizer film, and were respectively bonded onto both surfaces of the polarizer film using a polyvinyl alcohol-base adhesive, to thereby fabricate the integrated upper polarizer plate. The protective film was found to have Re of 3 nm, and Rth of 50 nm.

Assuming now that angle of stacking of the individual layers is represented while defining the lateral direction in a top view of the display device as a reference (0°), angle of the slow axes 102, 106 of the upper polarizer plate protective film was adjusted to 90°, and angle of the absorption axis 104 (element 2 in FIG. 1) of the polarizer film was again adjusted to 90°.

(Fabrication of First Optically-Anisotropic Layer)

A polycarbonate copolymer stretched film was fabricated according to the description of Example 3 in the specification of International Patent Publication WO0/26705. The stretched film was found to have Re values at 450 nm, 550 nm ad 650 nm of 55.3 nm, 60.0 nm and 60.6 nm, respectively. That is, the stretched film was found to show a positive refractive anisotropy, and to be a film capable of function as the first optically-anisotropic layer having Re of 56±5 nm in the visible light region. The retardation values herein were measured using an automatic birefringence analyzer KOBRA21DH, product of Oji Scientific Instruments. The same will apply also to any description hereinafter.

The stretched film was bonded, using a tacking material, to the transparent protective film (element 105 in FIG. 2) on the side closer to the liquid crystal cell of the fabricated upper polarizer plate, to thereby fabricate the integrated upper polarizer plate. The slow axis 4 of the polycarbonate copolymer stretched film and the absorption axis 15 of the polarizer film of the lower polarizer plate were aligned almost in parallel.

<Integrated Lower Polarizer Plate>

(Fabrication of Lower Polarizer Plate)

As a polarizer film for the lower polarizer plate, a polarizer film same as the upper polarizer plate fabricated in the above was fabricated. Fujitac TD80UF was then bonded as a protective film (protective film on the side more distant from the liquid crystal cell, element 101 in FIG. 2) on one surface of the polarizer plate.

(Fabrication of Second Optically-Anisotropic Layer Integrated With Transparent Support)

((Preparation of Alignment layer))

Next, the surface of Fujitac TD80UF(Re=3 nm, Rth=50 nm) was saponified. The saponification was carried out by immersing the film into a 2.0 N potassium hydroxide solution (25° C.) for 2 minutes, neutralizing with sulfuric acid, washing with pure water, and drying. Surface energy of thus-saponified film was measured by the contact method, and was found to be 63 mN/m. A coating solution having the composition shown below was coated on one surface of the saponified film using a #16 wire bar coater in an amount of 28 ml/m².

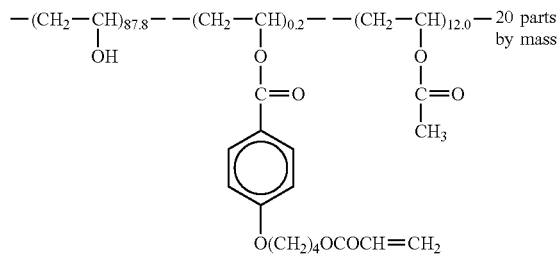

| Composition of Coating Liquid for Alignment layer | |
|---|---|
| Modified polyvinyl alcohol shown above: | 20 parts by mass |
| Water | 361 parts by mass |
| Methanol | 119 parts by mass |
| Glutaraldehyde (crosslinking agent) | 0.5 parts by mass |

The coated film was dried at 25° C. for 60 seconds, further with a hot air of 60° C. for 60 seconds, and still further with a hot air of 90° C. for 150 seconds. Thickness of the dried alignment layer was found to be 1.1 μm. Surface roughness of the alignment layer observed under an atomic force microscope (AFM, SPI3800N, product of Seiko Instruments Inc.) was 1.147 nm. Thus-formed film was then rubbed in the same direction with the slow axis of Fujitac TD80UF.

((Formation of Second Optically-Anisotropic Layer))

On the rubbed alignment layer, a coating solution containing discotic liquid crystal and having the composition shown below was coated.

| Composition of Coating Liquid of Discotic liquid Crystal | |
|---|---|
| Discotic liquid-crystalline compound (1)*1 | 32.6% by mass |
| Cellulose acetate butyrate | 0.7% by mass |
| Ethylene oxide-modified trimethylolpropane triacrylate (V#360, product of Osaka Organic Chemical Industry, Ltd.) | 3.2% by mass |
| Sensitizer (Kayacure DETX, product of Nippon Kayaku Co., Ltd.) | 0.4% by mass |
| Photo-polymerization initiator (Irgacure 907, product of Ciba-Geigy Corporation) | 1.1% by mass |
| Methyl ethyl ketone | 62.0% by mass |

*1 1,2,1′,2′,1″,2″-tris[4,5-di(vinylcarbonyloxy butoxybenzoyloxy)phenylene (Exemplary Compound TE-8-(8), m = 4, disclosed in Japanese Laid-Open Patent Publication No. 8-50206, paragraph [0044]) was used as the discotic liquid-crystalline compound (1).

The coated film was then dried under heating in a heating zone at 130° C. for 2 minutes, to thereby orient the discotic liquid-crystalline compound The discotic liquid-crystalline compound was then polymerized by UV irradiation at 130° C. for 4 seconds using a 120-W/cm high-pressure mercury lamp. The film was then allowed to stand for cooling to room temperature, to thereby form the second optically-anisotropic layer of 2.2 μm thick, having an optically negative refractive anisotropy, and having values of Re=0 nm and Rth-216 nm in the visible light range. The discotic liquid-crystalline molecules in the second optically-anisotropic layer were found to be homeotropically aligned with a ±2° inclination.

In this way, the second optically-anisotropic layer integrated with the transparent support was fabricated.

Thus-fabricated second optically-anisotropic layer was bonded to the lower polarizer plate using a polyvinyl alcohol-base adhesive to thereby fabricate the integrated lower polarizer plate, wherein the surface of the transparent support (Fujitac TD80UF), having no second optically-anisotropic layer formed thereon, was bonded to the surface of the polarizer film on the lower polarizer plate, having no protective film (Fujitac TD80UF) formed thereon.

Assuming now that angle of stacking of the individual layers in the integrated lower polarizer plate are represented while defining the lateral direction in a top view of the display device as a reference (0°), angle of the slow axes 104 of the polarizer film (element 15 in FIG. 1) was adjusted to 0°, and angles of slow axes 102, 106 of the protective films was adjusted again to 90°.

<Measurement of Leakage Light from Fabricated Liquid Crystal Display Device>

Viewing angle dependence of transmissivity of thus-fabricated liquid crystal display device was measured Measurement was made while varying the angle of elevation from the front towards oblique direction of 80° at 10° intervals, and while varying the azimuth angle over 360° at 10° intervals, assuming the horizontal rightward direction (0°) as a reference. It was found that luminance in the black display mode increased as the angle of elevation increased from the vertical direction due to increase in the light leakage transmissivity, and reached maximum at an angle of elevation of 60° or around. It was also found that increase in the black display transmissivity degraded contrast ratio which expresses ratio of white display transmissivity and black display transmissivity. The present inventors therefore decided to evaluate the viewing angle characteristics based on the vertical black display transmissivity and maximum leakage light transmissivity at an angle of elevation of 60°.

The vertical transmissivity in this Example was found to be 0.02%, and the maximum leakage light transmissivity at an angle of elevation of 60° was 0.04% at an azimuth angle of 30°. This means that the vertical contrast ratio is 500:1, and the contrast ratio at an angle of elevation of 60° is 250:1.

Example 2-2

Similar results were obtained in the measurement of leakage light from the fabricated liquid crystal display device even if a positional relation of the upper polarizer plate and lower polarizer plate with respect to the liquid crystal cell in Example 2-1 was inverted, that is, even if a positional relation of the first optically-anisotropic layer and second optically-anisotropic layer with respect to the liquid crystal was inverted.

Example 2-3

The liquid crystal cell and the polarizer film used herein were same as those used above in Example 2-1.

<Fabrication of Integrated Upper Polarizer Film>

(Fabrication of Upper Polarizer Film)

As a protective film of the polarizer film on the side more distant from the liquid crystal cell, a commercial cellulose triacetate film (Fujitac TD80UF, product of Fuji Photo Film Co., Ltd.) was used, similarly to as described in Example 2-1.

(Fabrication of First Optically-Anisotropic Layer)

As the protective film on the side closer to the liquid crystal cell, the first optically-anisotropic layer produced in Example 2-1 was used. That is, the first optically-anisotropic layer was also used as the protective film on the liquid-crystal-cell side of the upper polarizer plate. The Re value of the first optically-anisotropic layer measured at 550 nm was found to be 63 nm, and the Re value measured in the visible light region was 59±5 nm.

(Fabrication of Second Optically-Anisotropic Layer)

The obtained first optically-anisotropic layer was subjected to corona discharge treatment, and the alignment layer and the second optically-anisotropic layer formed of discotic liquid-crystalline molecules were respectively produced thereon similarly to as described in Example 2-1.

This was incorporated into the liquid crystal display device as the integrated upper polarizer plate, so as to dispose the second optically-anisotropic layer in contact with the liquid crystal cell. The slow axis (direction of rubbing) of the second optically-anisotropic layer herein was aligned in parallel with the slow axis of the first optically-anisotropic layer, and the slow axis of the first optically-anisotropic layer was aligned normal to the absorption axis 2 of the upper polarizer plate.

<Fabrication of Integrated Lower Polarizer Plate>

An integrated lower polarizer plate was produced as being configured similarly to the lower polarizer plate in Example 2-1, except that the alignment layer and second optically-anisotropic layer were omitted. This was incorporated into the liquid crystal display device as the integrated lower polarizer plate.

The liquid crystal display device was then fabricated similarly to as described in Example 2-1, except that the integrated lower polarizer plate produced in the above was incorporated into the liquid crystal display device as the upper and lower polarizer plates, in place of the upper and lower polarizer plates used in Example 2-1. Results of measurement of the leakage light were similar to those in Example 2-1.

Example 2-4

Although the support of the second optically-anisotropic layer was also used as the protective film for the lower polarizer plate, this was not applied herein to Example 2-4. That is, the polarizer plate having placed thereon Fujitac TD80UF as the protective film on the side closer to the liquid crystal cell was incorporated, as the lower polarizer plate, into the liquid crystal display device. The second optically-anisotropic layer integrated with the support was further produced similarly to as described in Example 2-1, and was incorporated between the liquid crystal cell and lower polarizer plate. For the case where the slow axes of the protective film on the side closer to the liquid crystal cell and the support of the second optically-anisotropic layer were aligned in the same direction, it was found necessary for the second optically-anisotropic layer to have a thickness of 1.4 µm, and Re and Rth values in the visible light region of 0 nm and 140 nm, respectively. Results of measurement of the leakage light of thus-fabricated liquid crystal display device were similar to those in Example 2-1.

Comparative Example 2-1

A film having Re of 3 nm and Rth of 120 nm was used for the transparent protective film (those used for the upper and lower polarizer plates) as described in Example 2-1, but the first optically-anisotropic layer was not produced on the transparent protective film of the upper polarizer plate. Other configurations are same as those in Example 2-1.

<Measurement of Leakage Light from Fabricated Liquid Crystal Display Device>

Viewing angle characteristic of leakage light in the black display mode of thus-fabricated liquid crystal display device was measured similarly to as described in Example 2-1. The vertical transmissivity in this Example was found to be 0.02%, and the maximum leakage light transmissivity at an angle of elevation of 60° was 0.35% at an azimuth angle of 45°.

It was shown that the Comparative Example 2-1 had a larger light leakage as compared with Examples 2-1 to 2-4 of the present invention, and this proved superiority of the present invention.

Comparative Example 2-2

The upper polarizer plate used herein was such as having Re and Rth values of the transparent protective film on the side closer to the liquid crystal cell of 36 nm and 173 nm, respectively; having an angle of the slow axis of the outer protective film (on the side more distant from the liquid crystal cell) of 0°; having an angle of the absorption axis 2 of the polarizer film of 0°; and having an angle of the slow axis of the protective film on the liquid-crystal-cell side of 90°.

Similarly, also the lower polarizer plate 14 used herein was such as having Re and Rth values of the transparent protective film on the side closer to the liquid crystal cell of 9 nm and 68 nm, respectively; having an angle of the slow axis of the outer protective film of 90°; having an angle of the absorption axis 15 of the polarizer film of 90°; and having an angle of the slow axis of the protective film on the liquid-crystal-cell side of 0°.

No optically-anisotropic layers other than the protective film were disposed respectively between the upper and lower polarizer plates and the liquid crystal cell. Other configurations of the liquid crystal display device were same as those in Example 2-1.

<Measurement of Leakage Light From Fabricated Liquid Crystal Display Device>

Viewing angle characteristic of leakage light in the black display mode of thus-fabricated liquid crystal display device was measured similarly to as described in Example 2-1. The vertical transmissivity in this Example was found to be 0.02%, and the maximum leakage light transmissivity at an angle of elevation of 60° was 0.17% at an azimuth angle of 30°.

It was shown that the Comparative Example 2-2 had a larger light leakage as compared with Examples 2-1 to 2-4 of the present invention, and this proved superiority of the present invention.

Comparative Example 2-3

All protective films of the upper and lower polarizer plates were exchanged to a commercial cellulose triacetate film (Fujitac TD80UF, product of Fuji Photo Film Co., Ltd., Re=3 nm, Rth=50 nm). One layer of retardation film C (3) was disposed between the upper polarizer plate and liquid crystal cell, and two layers of retardation films D (10, 12) were disposed between the lower polarizer plate and liquid crystal cell. Direction of the slow axis of the protective film on the polarizer plate, and absorption axis of the polarizer plate were set similarly to as described in Example 2-2.

The retardation film C comprises a norbornene-base stretched film, and has an average refractive index Nx in the direction of stretching of the film of 1.51, an average refractive index Ny in the direction normal to the direction of stretching of the film of 1.509, an average refractive index Nz of the thickness-wise direction of the film of 1.509, and a thickness of 95 μm. The Re value of the film was set to 95 nm, and the angle of the slow axis 4 thereof was set to 0°. Both of the retardation films D (10, 12) were composed of a norbornene-base stretched film, having an average refractive index Nx in the direction of stretching of the film of 1.51, an average refractive index Ny in the direction normal to the direction of stretching of the film of 1.51, an average refractive index Nz of the thickness-wise direction of the film of 1.5084, a thickness of 70 μm, Re of 5 nm, and Rth of 110 nm. These two films were stacked so that the slow axes thereof cross nearly normal to each other, and disposed so that the angle of the slow axis 13 of the film in contact with the lower polarizer plate was adjusted to 90°, and angle of the slow axis 10 of the film in contact with the liquid crystal cell was adjusted to 0°.

<Measurement of Leakage Light From Fabricated Liquid Crystal Display Device>

Viewing angle characteristic of leakage light in the black display mode of thus-fabricated liquid crystal display device was measured similarly to as described in Example 2-1. The vertical transmissivity in this Example was found to be 0.02%, and the maximum leakage light transmissivity at an angle of elevation of 60° was 0.17% at an azimuth angle of 30°.

It was shown that the Comparative Example 2-3 had a larger light leakage as compared with Examples 2-1 to 2-4 of the present invention, and needed as much as three retardation films, and this proved superiority of the present invention.

Comparative Example 2-4

A liquid crystal display device was configured as described in Example 2-3, except that the optically-anisotropic layer E composed of a coated cholesteric liquid-crystal was used in place of the retardation films D (10, 12) used in Comparative Example 2-3.

The optically-anisotropic layer E was formed referring to a method described in Japanese Laid-Open Patent Publication No. 2002-311243, in which the rod-like, liquid-crystalline compound A was given with optical activity by adding a chiral agent D shown below, to thereby allow it to function as a cholesteric layer. The layer having a thickness of 4 μm was found to have Re of 3 nm, Rth of 250 nm, and a pitch of the cholesteric liquid crystal of 130 nm. Thus-fabricated, optically-anisotropic layer E was disposed so as to adjust angle of the slow axis to 0° with respect to the lower polarizer plate.

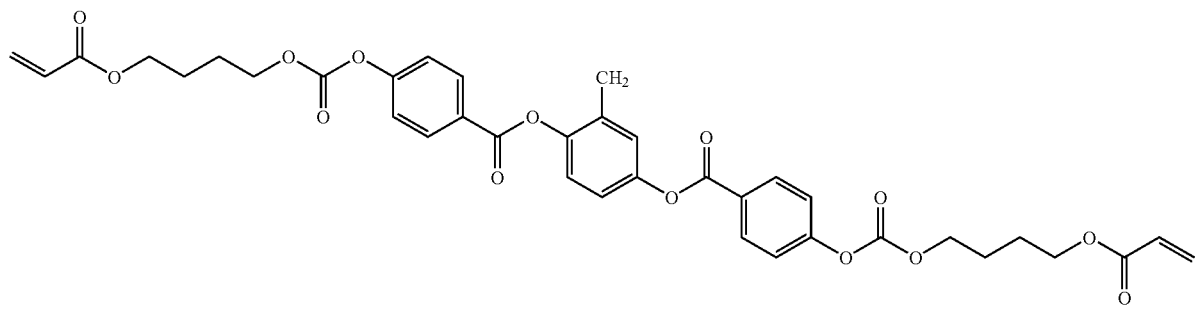

Rod-like Liquid-Crystalline Compound A

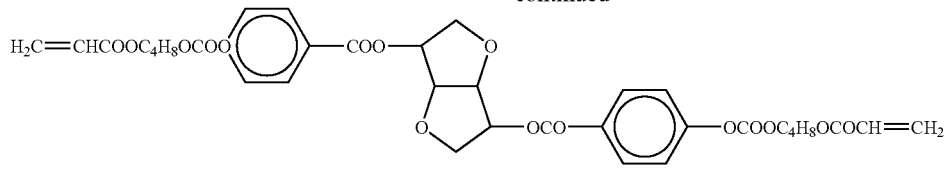

Chiral Agent D (polymerizable chiral agent having isosorbid nucleus)

<Measurement of Leakage Light from Fabricated Liquid Crystal Display Device>

Viewing angle characteristic of leakage light in the black display mode of thus-fabricated liquid crystal display device was measured similarly to as described in Example 1-1. The vertical transmissivity in this Comparative Example 1-4 was found to be 0.05%, and the maximum leakage light transmissivity at an angle of elevation of 60° was 0.17% at an azimuth angle of 30°.

It was shown that the Comparative Example 2-4 had a larger light leakage as compared with Examples 2-1 to 2-4 of the present invention, and needed one extra retardation film as compared with the present invention, and this proved superiority of the present invention.

Example 2-5

A liquid crystal display device configured as shown in FIG. 1 was fabricated similarly to as described in Example 2-1, except that the polarizer film and integrated upper polarizer plates were exchanged to those shown below. A stretched film used as the first optically-anisotropic layer was bonded using a tacking agent onto the transparent protective film (element 105 in FIG. 2) on the side closer to thus-fabricated upper polarizer plate, while aligning both longitudinal directions in parallel. The slow axis 4 of the polycarbonate copolymer stretched film and the absorption axis 2 of the upper polarizer plate of the lower polarizer plate were aligned almost normal to each other.

Results of measurement of the leakage light of thus-fabricated liquid crystal display device were similar to those in Example 2-1.

(Fabrication of Polarizer Film)

A PVA film having an average degree of polymerization of 2400, and a thickness of 100 μm was washed with ion exchanged water of 15 to 17° C. for 60 seconds, scraped on the surface thereof with a stainless-steel-made blade so as to remove water, immersed in an aqueous solution containing 0.77/1 of iodine and 60.0 g/l of potassium iodide at 40° C. for 55 seconds while correcting the concentration so as to keep a constant level, then immersed in an aqueous solution containing 42.5 g/l of boric acid and 30 g/l of potassium iodide at 40° C. for 90 seconds while correcting the concentration so as to keep a constant level, scraped on both surfaces thereof with a stainless-steel-made blade so as to remove excessive water to thereby keep water content of the film to 2% or less, and then introduced into a tenter stretching machine shown in FIG. 2 of Japanese Laid-Open Patent Publication No. 2002-131548. The film was stretched as long as five times at a feeding speed of 4 m/min and a length of feeding of 100 m under an atmosphere of 60° C., 95% RH, dried in 70° C. atmosphere while keeping the width constant, and separated from the tenter. Water content of the PVA film before stretching was 32%, and water content after the drying was 1.5%. No deformation of the film at the exit of the tenter was observed. Thickness of the film after the stretching and drying was found to be 18 μm.

Both edge portions of the stretched film as wide as 3 cm in the width-wise direction were slit off using a cutter, and on both surfaces of the film, saponified commercial cellulose triacetate films (Fujitac TD80UF, product of Fuji Photo Film Co., Ltd., Re=3 nm, Rth=50 nm) were bonded using a 3% aqueous solution of PVA (PVA-117H, product of Kuraray Co., Ltd.) as an adhesive, and heated at 70° C. for 10 minutes, to thereby obtain a polarizer plate having an effective width of 650 mm and having, on both surfaces of which, cellulose triacetate protective films.

Thus-obtained polarizer film was found to have the absorption axis 90° inclined away from the longitudinal direction. No color fading streak was observed by visual inspection.

Example 2-6

<Fabrication of Integrated Upper Polarizer Plate>

(Fabrication of First Optically-Anisotropic Layer)

((Fabrication of Cellulose Acetate Propionate Film))

The composition shown below was placed into a mixing tank, stirred under heating so as to dissolve the individual components, to thereby prepare a cellulose acetate propionate solution.

| Composition of Cellulose Acetate Propionate Solution | |
|---|---|
| Cellulose acetate propionate ("CAP-482-20" manufactured by EASTMAN CHEMICAL, CO. LTD.) | 100 parts by mass |
| Triphenyl phosphate (plasticizer) | 3.9 parts by mass |
| Biphenyl diphenyl phosphate (plasticizer) | 1.9 parts by mass |
| Methylene chloride (first solvent) | 317 parts by mass |
| Methanol (second solvent) | 28 parts by mass |
| Silica (particle diameter of 0.2 micro meters) | 0.1 parts by mass |

In a separate mixing tank, 20 parts by mass of the retardation controlling agent shown below, 87 parts by mass of methylene chloride and 13 parts by mass of methanol were placed, and stirred under heating, to thereby prepare a retardation controlling agent solution 01.

Forty-five parts by mass of the retardation controlling agent solution 01 was then added to 451 parts by mass of a cellulose acetate propionate solution, and thoroughly stirred to thereby prepare a dope. Amount of addition of the retardation controlling agent was 7.5 parts by mass relative to 100 parts by mass of cellulose acetate propionate. The cellulose acetate propionate used in the example had an acetylation degree "A" of 0.18 and a $C_3$ acylation degree "B" of 2.47, and thus satisfied the formula (C). The acylation degrees were measured by the above mentioned method.

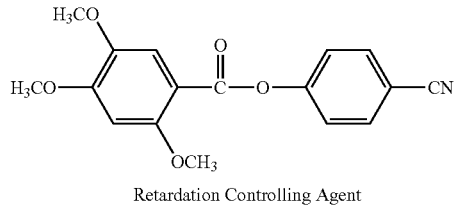

Retardation Controlling Agent

The obtained dope was flow cast on a band stretching machine. A film having a residual solvent content of 25% by mass was width-direction stretched at 130° C. in 30% stretching ration by a tenter to form a cellulose acetate propionate film (92 μm thickness) The obtained cellulose acetate propionate film was used as a first optically anisotropic layer. The obtained cellulose acetate propionate film was measured for Re value and Rth value at a wavelength of 550 nm using OBRA21DH, product of Oji Scientific Instruments. Re was found to be 61 nm and Rth was found to be 156 nm.

(Fabrication of Second Optically-Anisotropic Layer)

The surface of the obtained cellulose acetate propionate film, namely first optically anisotropic layer, was saponified and an alignment layer was formed on the surface in the same manner as Example 2-1. The coating solution as same as used for the second optically anisotropic layer in Example 2-1 was applied on the alignment layer to form a second optically anisotropic layer having a 0.7 μm thickness and Re of 0 nm and Rth of 70 nm at 550 nm. The discotic liquid crystal molecules were homeotropically aligned within ±2° in the second optically anisotropic layer.

Using this, an integrated upper polarizer plate was produced in the same manner as Example 2-1, and the obtained polarizer plate was disposed in a liquid crystal display device in the same manner as Example 2-3.

<Fabrication of Integrated Lower Polarizer Plate>

An integrated lower polarizer plate was produced in the same manner as Example 2-3 and the obtained polarizer plate was disposed in a liquid crystal display device in the same manner as Example 2-3.

<Measurement of Leakage Light From Fabricated Liquid Crystal Display Device>

A liquid crystal display device was produced in the same manner as Example 2-3 except that the integrated upper polarizer plate was used. Leakage light from the device was measured. The vertical transmissivity in this example was found to be 0.02%, and the maximum leakage light transmissivity at an angle of elevation of 60° was 0.05% at an azimuth angle of 30°. This means that the vertical contrast ratio is 500:1, and the contrast ratio at an angle of elevation of 60° is 200:1.

Example 2-7

<Fabrication of Integrated Upper Polarizer Plate>

(Fabrication of First Optically Anisotropic Layer)

((Fabrication of Cellulose Acetate Butyrate Film))

The composition shown below was placed into a mixing tank, stirred under heating so as to dissolve the individual components, to thereby prepare a cellulose acetate butyrate solution.

| Composition of Cellulose Acetate Butyrate Solution | |
|---|---|
| Cellulose acetate butyrate ("CAB-381-20" manufactured by EASTMAN CHEMICAL, CO. LTD.) | 100 parts by mass |
| Triphenyl phosphate (plasticizer) | 2.0 parts by mass |
| Biphenyl diphenyl phosphate (plasticizer) | 1.0 parts by mass |
| Methylene chloride (first solvent) | 309 parts by mass |
| Methanol (second solvent) | 27 parts by mass |
| Silica (particle diameter of 0.2 micro meters) | 0.1 parts by mass |

Forty-four parts by mass of the retardation controlling agent solution 01 was then added to 439 parts by mass of a cellulose acetate butyrate solution, and thoroughly stirred to thereby prepare a dope. Amount of addition of the retardation enhancer was 7.5 parts by mass relative to 100 parts by mass of cellulose acetate butyrate. The cellulose acetate butyrate used in this example had an acetylation degree "A" of 1.00 and an $C_4$ acylation degree "B" of 1.66, and thus satisfied the formula (C). The acylation degrees were measured by the above mentioned method.

An cellulose acetate butyrate film (thickness:92 μm), namely first optically anisotropic layer, was produced in the same manner as Example 2-6. The obtained cellulose acetate butyrate film was used as a first optically anisotropic layer. The obtained cellulose acetate butyrate film was measured for Re value and Rth value at a wavelength of 550 nm using OBRA21DH, product of Oji Scientific Instruments. Re was found to be 60 nm and Rth was found to be 153 nm.

A second optically anisotropic layer, an integrated upper polarizer plate and an integrated lower polarizer plate were produced in the same manner as Example 2-6, and then a liquid crystal display device was produced in the same manner as Example 2-6. the measured leakage light from the device was same as that measured in Example 2-6.

INDUSTRIAL APPLICABILITY

It was made possible by the present invention to optically compensate the liquid crystal cell by adopting particular optically-anisotropic layers without altering configuration of conventional liquid crystal display device. The liquid crystal display device having such optically-anisotropic layers of the present invention is considerably improved not only in its display quality but also-in the viewing angle. Although the conventional liquid crystal display device, having an optical compensation sheet incorporated therein, needed a process of stacking a plurality of retardation films and polarizer plate while precisely adjusting the angle therebetween, such process is no more necessary in the present invention, and raises a large cost merit. In conclusion, the present invention is successful in providing a liquid crystal display device, in particular that of the VA mode, having the liquid crystal cell optically compensated in an exact manner, needing only a small number of layers to be bonded, and can consequently be thinned.

The invention claimed is:

1. A liquid crystal display device comprising:
two polarizer films having absorption axes being crossed normal to each other;
a liquid crystal cell disposed between these two polarizer films, comprising a pair of substrate and a liquid crystal layer composed of liquid-crystalline molecules held therebetween, wherein liquid-crystalline molecules are oriented substantially normal to the substrates under non-operative state in the absence of applied external electric field;
at least one layer of a first optically-anisotropic layer having an optically positive refractive anisotropy, being formed of rod-like liquid-crystalline molecules and having Re, defined below, falling within a range from 40 to 150 nm at visible light; and
at least one layer of a second optically-anisotropic layer having an optically negative refractive anisotropy, and having Re ,defined below, of 10 nm or less and Rth, defined below, falling within a range from 60 to 250 nm at visible light:

$$Re=(nx-ny) \times d \quad (1)$$

$$Rth=\{(nx+ny)/2-nz\} \times d \quad (2)$$

(where, nx denotes refractive index in the slow-axis direction in a layer plane; ny denotes in-plane refractive index in the direction normal to nx; nz denotes refractive index in the thickness-wise direction of a layer; and d denotes thickness of a layer).

2. The liquid crystal display device of claim 1, wherein the first optically-anisotropic layer is a layer formed of rod-like liquid-crystalline molecules having a polymerizable group.

3. The liquid crystal display device of claim 2, wherein the first optically-anisotropic layer is a layer formed of rod-like liquid-crystalline molecules each represented by a formula (I) below:

Formula (I)

where, each of $Q^1$ and $Q^2$ independently denotes a polymerizable group; each of $L^1$, $L^2$, $L^3$ and $L^4$ independently denotes a single bond or divalent linking group; each of A1 and A2 independently denotes a $C_{2-20}$ spacer group; and M denotes a mesogen group.

4. The liquid crystal display device of claim 1, wherein the first optically-anisotropic layer is a layer formed of rod-like liquid-crystalline molecules homogenously oriented in the direction substantially normal to the absorption axis of the polarizer film disposed closer to the first optically-anisotropic layer.

5. The liquid crystal display device of claim 1, wherein the second optically-anisotropic layer is a layer formed of discotic liquid-crystalline molecules or polymer.

6. The liquid crystal display device of claim 5, wherein the second optically-anisotropic layer is a layer formed of discotic liquid-crystalline molecules having a polymerizable group.

7. The liquid crystal display device of claim 6, wherein the second optically-anisotropic layer is a layer formed of a discotic liquid-crystalline molecules oriented substantially in a homeotropic manner.

8. The liquid crystal display device of claim 1, wherein the second optically anisotropic layer is formed of cellulose acylate having acetyl and $C_{3-22}$ acyl replacing hydroxy and a degree of acetylation "A" and a degree of $C_{3-22}$ acylation "B" satisfy the formula (C) below $$2.0 \leq A+B \leq 3.0. \quad \text{Formula (C)}$$

9. The liquid crystal display device of claim 8 wherein the $C_{3-22}$ acyl is butanoyl or propionyl.

10. The liquid crystal display device of claim 1, wherein the second optically-anisotropic layer also functions as a protective film for at least one of the two polarizer films.

11. The liquid crystal display device of claim 1, wherein the first optically-anisotropic layer and the second optically-anisotropic layer are disposed while placing the liquid crystal cell between the first and the second layers.

12. The liquid crystal display device of claim 1, wherein the absorption axis of the polarizer film disposed closer to the first optically-anisotropic layer crosses substantially normal to the longitudinal direction of a transparent protective film of the polarizer film.

13. The liquid crystal display device of claim 1, wherein at least one of the two polarizer films has a protective film formed of cellulose acetate which is disposed closer to the liquid crystal cell and has Re of less than 3 nm.

14. A liquid crystal display device comprising:
two polarizer films having the absorption axes being crossed normal to each other;
a liquid crystal cell disposed between these two polarizer films, comprising a pair of substrate and a liquid crystal layer composed of liquid-crystalline molecules held therebetween, wherein liquid-crystalline molecules are oriented substantially normal to the substrates under non-operative state in the absence of applied external electric field;
at least one layer of a first optically-anisotropic layer formed of a stretched thermoplastic polymer film having an optically positive refractive anisotropy, and having Re, defined below, falling within a range from 40 to 150 nm at visible light; and
at least one layer of a second optically-anisotropic layer having an optically negative refractive anisotropy, formed of discotic liquid-crystalline molecules, and having Re, defined below, of 10 nm or less and Rth falling within a range from 60 to 250 nm at visible light:

$$Re=(nx-ny) \times d \quad (1)$$

$$Rth=\{(nx+ny)/2-nz\} \times d \quad (2)$$

(where, nx denotes refractive index in the slow-axis direction in a layer plane; ny denotes in-plane refractive index in the direction normal to nx; nz denotes refractive index in the thickness-wise direction of the layer; and d denotes thickness of a layer).

15. The liquid crystal display device of claim 14, wherein the first optically-anisotropic layer is a stretched polycarbonate copolymer film.

16. A liquid crystal display device comprising:
two polarizer films having the absorption axes being crossed normal to each other;
a liquid crystal cell disposed between these two polarizer films, comprising a pair of substrate and a liquid crystal layer composed of liquid-crystalline molecules held therebetween, wherein liquid-crystalline molecules are oriented substantially normal to the substrates under non-operative state in the absence of applied external electric field;

at least one layer of a first optically-anisotropic layer formed of cellulose acylate having an optically positive refractive anisotropy, and having Re, defined below, falling within a range from 40 to 150 nm at visible light, wherein the cellulose acylate has acetyl and $C_{3\text{-}22}$ acyl replacing hydroxy and a degree of acetylation "A" and a degree of $C_{3\text{-}22}$ acylation "B" satisfy the formula (C) below; and at least one layer of a second optically-anisotropic layer having an optically negative refractive anisotropy, formed of discotic liquid-crystalline molecules, and having Re, defined below, of 10 nm or less and Rth falling within a range from 60 to 250 nm at visible light:

$$Re = (nx - ny) \times d \quad (1)$$

$$Rth = \{(nx + ny)/2 - nz\} \times d \quad (2)$$

(where, nx denotes refractive index in the slow-axis direction in a layer plane; ny denotes in-plane refractive index in the direction normal to nx; nz denotes refractive index in the thickness-wise direction of the layer; and d denotes thickness of a layer);

$$20 \leq A + B \leq 3.0. \quad \text{Formula (C)}$$

17. The liquid crystal display device of claim 16 wherein the $C_{3\text{-}22}$ acyl is butanoyl or propionyl.

18. The liquid crystal display device of claim 14, wherein the second optically-anisotropic layer is formed of discotic liquid-crystalline molecules having a polymerizable group.

19. The liquid crystal display device of claim 14, wherein the discotic liquid-crystalline molecules of the second optically-anisotropic layer are oriented substantially in a homeotropic manner.

20. The liquid crystal display device of claim 14, wherein the first optically-anisotropic layer also functions as a protective film for at least one of the two polarizer films.

21. The liquid crystal display device of claim 14, wherein the absorption axis of the polarizer film closer to the first optically-anisotropic layer crosses substantially normal to the longitudinal direction of a transparent protective film of the polarizer film.

22. The liquid crystal display device of claim 14, wherein at least one of the two polarizer films has a protective film formed of cellulose acetate which is disposed closer to the liquid crystal cell and has Re of less than 3 nm.

23. The liquid crystal display device of claim 16, wherein the second optically-anisotropic layer is formed of discotic liquid-crystalline molecules having a polymerizable group.

24. The liquid crystal display device of claim 16, wherein the discotic liquid-crystalline molecules of the second optically-anisotropic layer are oriented substantially in a homeotropic manner.

25. The liquid crystal display device of claim 16, wherein the first optically-anisotropic layer also functions as a protective film for at least one of the two polarizer films.

26. The liquid crystal display device of claim 16, wherein the absorption axis of the polarizer film closer to the first optically-anisotropic layer crosses substantially normal to the longitudinal direction of a transparent protective film of the polarizer film.

27. The liquid crystal display device of claim 16, wherein at least one of the two polarizer films has a protective film formed of cellulose acetate which is disposed closer to the liquid crystal cell and has Re of less than 3 nm.

* * * * *